United States Patent
Ma et al.

(10) Patent No.: US 12,170,959 B2
(45) Date of Patent: Dec. 17, 2024

(54) TERMINAL POWER SAVING METHOD, POWER SAVING APPARATUS, INFORMATION SENDING METHOD AND APPARATUS, STORAGE MEDIUM, AND ELECTRONIC DEVICE

(71) Applicant: ZTE Corporation, Guangdong (CN)

(72) Inventors: Xuan Ma, Guangdong (CN); Jun Xu, Guangdong (CN); Focai Peng, Guangdong (CN); Mengzhu Chen, Guangdong (CN); Hao Wu, Guangdong (CN); Qiujin Guo, Guangdong (CN); Xiaoying Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 414 days.

(21) Appl. No.: 17/668,812

(22) Filed: Feb. 10, 2022

(65) Prior Publication Data

US 2022/0167267 A1    May 26, 2022

Related U.S. Application Data

(63) Continuation of application No. PCT/CN2020/109143, filed on Aug. 14, 2020.

(30) Foreign Application Priority Data

Aug. 15, 2019    (CN) .......................... 201910755353.5

(51) Int. Cl.
*H04W 52/02*    (2009.01)
(52) U.S. Cl.
CPC .............................. *H04W 52/0216* (2013.01)

(58) Field of Classification Search
CPC ......... H04W 52/0216; H04W 52/0235; H04W 76/28; H04W 52/0212; H04W 52/0229; Y02D 30/70
See application file for complete search history.

(56) References Cited

U.S. PATENT DOCUMENTS

| 2018/0139778 A1 | 5/2018 | Chou et al. |
| 2019/0124558 A1 | 4/2019 | Ang et al. |
| 2019/0222404 A1 | 7/2019 | Ang et al. |
| 2020/0100170 A1* | 3/2020 | Babaei .............. H04W 74/0833 |
| 2020/0229081 A1* | 7/2020 | Ang .................. H04W 72/0453 |

FOREIGN PATENT DOCUMENTS

| CN | 105813132 A | 7/2016 |
| CN | 109496454 A | 3/2019 |
| CN | 109600826 A | 4/2019 |
| CN | 110012499 A | 7/2019 |

(Continued)

OTHER PUBLICATIONS

European Extended Search Report received for Application No. EP 20 85 1671 mailed Aug. 31, 2022 (13 pages).

(Continued)

*Primary Examiner* — Marisol Figueroa
(74) *Attorney, Agent, or Firm* — Crowell & Moring LLP

(57) ABSTRACT

A terminal can save power by utilizing preset conditions. For example, when a first preset condition is satisfied, a first carrier currently activated is switched to a power saving state. The first preset condition is satisfied for indicating a power saving operation to be performed.

19 Claims, 6 Drawing Sheets

(56) References Cited

FOREIGN PATENT DOCUMENTS

| CN | 111083770 A | 4/2020 | |
|---|---|---|---|
| WO | WO-2019160493 A1 * | 8/2019 | ............ H04L 1/0026 |

OTHER PUBLICATIONS

Qualcomm Incorporated: "Open Issues on CA", 3GPP TSG Draft; RI-1718581 Open Issues on CA, 3rd Generation Partnership Project (3GPP), Mobile Competence Centre ; 650, Route Des Lucioles; F-06921 Sophia-Antipolis Cedex ; France vol. RAN WGI, No. Prague, Czech Republic, Oct. 9-13, 2017 (10 pp.).

Qualcomm Incorporated: "Fast SCG and SCell Activation", 3GPP Draft; RI-1907306 Fast SCG and SCell Activation, 3rd Generation Partnership Project (3GPP), Mobile Competence Centre; 650, Route Des Lucioles; F-06921 Sophia-Antipolis Cedex ; France vol. Ran WGL, No. Reno, USA; May 13, 2019-May 17, 2019, May 13-17, 2019 (11 pp.).

CATT: "PDCCH-Based Power Saving Signal/Channel Design", 3GPP Draft; RI-1906350_PDCCH-Based Power Saving Signal/Channel Design, 3rd Generation Partnership Project (3GPP), Mobile Competence Centre; 650, Route Des Lucioles; F-06921 Sophia-Antipolis Cedex; F vol. RAN WGI, No. Reno, USA; May 13, 2019-May 17, 2019, May 13-17, 2019 (14 pp.).

International Search Report and Written Opinion received for Application No. PCT/CN2020/109143 mailed Nov. 5, 2020 (9 pages).

Office Action for China Patent Application No. 201910755353.5 mailed Mar. 1, 2023 (15 pages).

Office Action for China Patent Application No. 201910755353.5 mailed Dec. 7, 2022 (17 pages).

Search Report and Written Opinion dated May 22, 2024, in Singapore Patent Application No. 11202200305W (7 pp.).

* cited by examiner

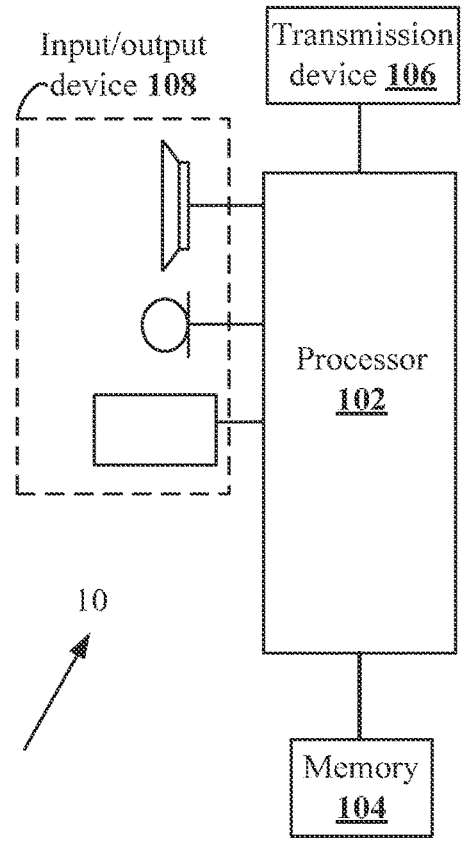

FIG. 1

In a case where a first preset condition is satisfied, switching a first carrier currently activated to a power saving state, where the first preset condition is satisfied for indicating a power saving operation to be performed — S202

FIG. 2

Sending first power saving indication information to a terminal, where the first power saving indication information is configured for indicating that a first carrier currently activated is to be switched to a power saving state by the terminal — S301

FIG. 3

TERMINAL POWER SAVING METHOD, POWER SAVING APPARATUS, INFORMATION SENDING METHOD AND APPARATUS, STORAGE MEDIUM, AND ELECTRONIC DEVICE

PRIORITY

This application claims priority as a Continuation of PCT/CN2020/109143, filed on Aug. 14, 2020, entitled "Terminal Power Saving Method, Power Saving Apparatus, Information Sending Method and Apparatus, Storage Medium, and Electronic Device", published as WO 2021/027918 A1, which claims priority to Chinese patent application No. 201910755353.5 filed on Aug. 15, 2019. The entireties of the above applications are incorporated herein by reference.

TECHNICAL FIELD

The present disclosure relates to the field of communications, for example, a method for saving power of a terminal, an apparatus for saving power, a method and apparatus for sending information, a storage medium and an electronic apparatus.

BACKGROUND

In a multi-carrier wireless communications system, if a base station configures self-scheduling for two or more carriers, a UE is required to perform physical downlink control channel monitoring (PDCCH monitoring) and channel measurement on all carriers configured with self-scheduling in order to receive or send data at any time.

In the case of no traffic transmission or sparse traffic, continuous intensive PDCCH monitoring on a secondary cell (SCell) without data scheduling (that is, PDCCH-Only) will generate a lot of unnecessary power consumption. In a protocol in the related art, the power consumption of the terminal can be reduced by using a media access control element (MAC CE) to indicate the activation or deactivation of the SCell. The UE does not perform operations such as PDCCH monitoring, channel measurement, and data reception on a deactivated SCell.

For example, in a 5G new radio (NR) access technology communication system in the related art, a SCell has two states, that is, an active state and an inactive state. If one SCell or multiple SCells are configured, the UE can activate or deactivate the configured SCells by receiving the SCell Activation/Deactivation MAC CE sent by the base station, and the base station can also configure one sCellDeactivationTimer for each activated SCell (except for the SCell configured with a physical uplink control channel (PUCCH)). When the sCellDeactivationTimer expires, the SCell associated with such Timer is deactivated.

Activation/deactivation of the SCell through the MAC CE will cause a problem of large delay, and frequent activation/deactivation operations will bring about a large amount of unnecessary power consumption. Using such solution cannot achieve a good effect of reducing the power consumption of the terminal.

SUMMARY

The present disclosure provides a method for saving power of a terminal, an apparatus for saving power, a method and apparatus for sending information, a storage medium and an electronic apparatus so as to at least solve the problem of high power consumption of a terminal in the related art.

According to an embodiment of the present disclosure, a method for saving power of a terminal is provided. The method includes: in a case where a first preset condition is satisfied, switching a first carrier currently activated to a power saving state, where the first preset condition is satisfied for indicating a power saving operation to be performed.

According to another embodiment of the present disclosure, a method for sending information is provided. The method includes sending first power saving indication information to a terminal, where the first power saving indication information is configured for indicating that a first carrier currently activated is to be switched to a power saving state by the terminal.

According to another embodiment of the present disclosure, an apparatus for saving power is provided. The apparatus includes a first switching module configured to: in a case where a first preset condition is satisfied, switch a first carrier currently activated to a power saving state, where the first preset condition is satisfied for indicating a power saving operation to be performed.

According to another embodiment of the present disclosure, an apparatus for sending information is further provided. The apparatus includes a first sending module configured to send first power saving indication information to a terminal, where the first power saving indication information is configured for indicating that a first carrier currently activated is to be switched to a power saving state by the terminal.

According to another embodiment of the present disclosure, a storage medium is further provided and stores a computer program. When the computer program is executed, the steps in any one of the preceding method embodiments are performed.

According to another embodiment of the present disclosure, an electronic apparatus is further provided. The electronic apparatus includes a memory and a processor. The memory stores a computer program, and the processor is configured to execute the computer program to perform the steps in any one of the preceding method embodiments.

According to embodiments of the present disclosure, in the case where the first preset condition is satisfied, the first carrier currently activated is switched to the power saving state, where the first preset condition is satisfied for indicating the power saving operation to be performed. Therefore, the problem of high power consumption of the terminal in the related art can be solved, and the effects of reducing delay and power consumption of the terminal can be achieved.

BRIEF DESCRIPTION OF DRAWINGS

FIG. 1 is a block diagram illustrating a hardware structure of a mobile terminal executing a method for saving power of a terminal according to an embodiment of the present disclosure;

FIG. 2 is a flowchart of a method for saving power of a terminal according to an embodiment of the present disclosure;

FIG. 3 is a flowchart of a method for sending information according to an embodiment of the present disclosure;

DETAILED DESCRIPTION

Figure 4:
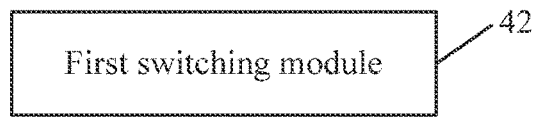
FIG. 4 is a block diagram illustrating a structure of an apparatus for saving power according to an embodiment of the present disclosure.

The present disclosure will be hereinafter described in detail with reference to drawings in conjunction with embodiments. It is to be noted that if not in collision, the embodiments and features therein in the present application may be combined with each other.

It is to be noted that the terms "first", "second" and the like in the description, claims and the preceding drawings of the present disclosure are used to distinguish between similar objects but not necessarily used to describe a particular order or sequence.

Embodiment One

The method embodiment provided in embodiment one of the present application may be performed in a mobile terminal, a computer terminal or other similar computing apparatuses. Using an example in which the method is to be executed in the mobile terminal for illustration, FIG. 1 is a block diagram illustrating a hardware structure of a mobile terminal executing a method for saving power of a terminal according to an embodiment of the present disclosure. As shown in FIG. 1, a mobile terminal 10 may include one or more (merely one is shown in FIG. 1) processors 102 (the processor 102 may include, but is not limited to, a processing apparatus such as a microprocessor control unit (MCU) or a field programmable gate array (FPGA)) and a memory 104 for storing data. Optionally, the mobile terminal may further include a transmission device 106 for implementing a communication function and an input/output device 108. It is to be understood by those skilled in the art that the structure shown in FIG. 1 is merely illustrative and not intended to limit the structure of the preceding mobile terminal. For example, the mobile terminal 10 may further include more or fewer components than the components shown in FIG. 1 or may have a configuration different from the configuration shown in FIG. 1.

The memory 104 may be configured to store a computer program such as a software program and a module of application software, for example, the computer program corresponding to the method for saving power of a terminal in the embodiment of the present disclosure. The processor 102 executes the computer program stored in the memory 104 to perform various functional applications and data processing, that is, to implement the preceding method. The memory 104 may include a high-speed random-access memory, and may further include a nonvolatile memory such as one or more magnetic storage apparatuses, flash memories or other nonvolatile solid-state memories. In some examples, the memory 104 may include memories which are remotely disposed with respect to the processor 102 and these remote memories may be connected to the mobile terminal 10 via a network. The examples of the preceding network include, but are not limited to, the Internet, an intranet, a local area network, a mobile communication network and a combination thereof.

The transmission device 106 is configured to receive or send data via a network. Specific examples of the preceding network may include a wireless network provided by a communications provider of the mobile terminal 10. In an example, the transmission device 106 includes a network interface controller (NIC) which may be connected to other network devices via a base station and thus can communicate with the Internet. In an example, the transmission device 106 may be a radio frequency (RF) module which is configured to communicate with the Internet in a wireless manner.

The embodiment provides a method for saving power of a terminal executed on the preceding mobile terminal. FIG. 2 is a flowchart of a method for saving power of a terminal according to an embodiment of the present disclosure. As shown in FIG. 2, the method includes the step described below.

In step S202, in a case where a first preset condition is satisfied, a first carrier currently activated is switched to a power saving state, where the first preset condition is satisfied for indicating a power saving operation to be performed.

According to the embodiment of the present disclosure, in the case where the first preset condition is satisfied, the first carrier currently activated is switched to the power saving state, where the first preset condition is satisfied for indicating the power saving operation to be performed. Therefore, the problem of high power consumption of the terminal in the related art can be solved, and the effects of reducing delay and power consumption of the terminal can be achieved.

It is to be noted that for switching the first carrier currently activated to the power saving state, the "power saving state" may refer to different states under different conditions, scenarios and situations, and it can be considered as "switching the first carrier currently activated to the power saving state" as long as more power is saved or the power consumption is lower in the switched "power saving state" than in the current state of the first carrier. For example, when more data is to be scheduled on the first carrier, the first carrier may be switched to a state in which the data transmission rate is higher if switching the first carrier to the state in which the data transmission rate is high can save more power. For example, when almost no data is to be scheduled on the first carrier, the first carrier may be switched to other more-power saving states such as a state in which PDCCH monitoring is not performed or a state in which PDCCH monitoring is performed but the bandwidth is smaller or the number of multiple input multiple output (MIMO) layers is smaller.

In an implementation, the step of switching the first carrier currently activated to the power saving state includes: performing state switching on a first bandwidth part currently activated in the first carrier, and switching the first bandwidth part to the power saving state; or switching a first bandwidth part currently activated in the first carrier to a second bandwidth part in the first carrier, where the second bandwidth part has a higher power saving level than the first bandwidth part.

It is to be noted that it may be considered that the higher the power saving level, the more power will be saved.

In an implementation, the steps of performing the state switching on the first bandwidth part currently activated in the first carrier and switching the first bandwidth part to the power saving state include a step described below.

The first bandwidth part is switched to a dormant state, where in a case where the first bandwidth part is in the dormant state, a dormant operation is performed on the first bandwidth part.

It is to be noted that switching a first bandwidth part currently activated in the first carrier to a second bandwidth part in the first carrier may be switching a first bandwidth part currently activated in the first carrier to a dormant second bandwidth part in the first carrier. The dormant second bandwidth part has the same properties as the above-mentioned "dormant state", for example, a dormant operation is performed on the dormant second bandwidth part.

In an implementation, the dormant operation includes not performing a control channel monitoring operation on the first bandwidth part, and performing at least one of channel state information (CSI) measurement, automatic gain control (AGC) or beam management.

In an implementation, the step of switching the first carrier currently activated to the power saving state further includes a step described below.

In a case where the first carrier is switched to the power saving state, a second carrier is also switched to the power saving state, where a bundle relationship is configured between the first carrier and the second carrier.

In an implementation, the step of switching the second carrier to the power saving state in the case where the first carrier is switched to the power saving state includes a step described below.

In a case where the first carrier is switched to a first designated state, the second carrier is also switched to the first designated state; and/or in a case where the first carrier is switched to a second designated state, the second carrier is also switched to the second designated state.

It is to be noted that the "first designated state" may be a designated bandwidth part having low power consumption, and the "second designated state" may be a designated bandwidth part having the maximum transmission rate.

In an implementation, the step of switching the second carrier to the power saving state in the case where the first carrier is switched to the power saving state includes a step described below.

In the case where the first carrier is switched to the power saving state, a third bandwidth part currently activated in the second carrier is switched to the power saving state.

Alternatively, in the case where the first carrier is switched to the power saving state, a third bandwidth part currently activated in the second carrier is switched to a fourth bandwidth part in the second carrier, where the fourth bandwidth part has a higher power saving level than the third bandwidth part.

In an implementation, the step of switching the second carrier to the power saving state in the case where the first carrier is switched to the power saving state includes: in a case where a primary carrier is switched to the power saving state, switching a secondary carrier to the power saving state.

In an implementation, the step of switching the secondary carrier to the power saving state in the case where the primary carrier is switched to the power saving state includes: in a case where the primary carrier is switched to a first power saving level, switching the secondary carrier to a second power saving level, where the second power saving level is higher than or equal to the first power saving level.

In an implementation, the first preset condition is that first power saving indication information is received, and the first power saving indication information is configured for indicating that the first carrier is to be switched to the power saving state.

In an implementation, the first power saving indication information is further configured for indicating switching of a second carrier to the power saving state, where the first carrier and the second carrier belong to a same terminal.

In an implementation, a bit corresponding to a designated carrier is configured in the first power saving indication information, where the bit is configured for indicating that a corresponding operation is to be performed on the designated carrier.

In an implementation, the bit is configured for indicating that at least one of the following operations is to be performed on the designated carrier: changing a state of the designated carrier, not changing a state of the designated carrier, switching a bandwidth part on the designated carrier, not switching a bandwidth part on the designated carrier, performing a control channel monitoring operation on the designated carrier or not performing a control channel monitoring operation on the designated carrier.

In an implementation, the first power saving indication information is downlink control information carrying a power saving indication identifier.

In an implementation, the first power saving indication information is received in a shared search space or a self-scheduled search space.

In an implementation, the first power saving indication information further carries at least one of:

a first identifier for indicating whether the shared search space is enabled; or a second identifier for indicating whether the self-scheduled search space is enabled.

In an implementation, the first power saving indication information is radio resource control (RRC) signaling or a MAC CE.

In an implementation, whether the shared search space or the self-scheduled search space is enabled is determined according to whether a first timer expires, and the first timer is activated in discontinuous receiving-ON (DRX-ON) duration.

In an implementation, the self-scheduled search space is enabled while the first timer is in operation; and the shared search space is enabled after the first timer expires.

In an implementation, the preset condition is that a second timer expires, and the second timer is configured for indicating that the first carrier is to be switched to the power saving state.

In an implementation, before the first carrier currently activated is switched to the power saving state, the method further includes: receiving a wake up indication; and entering a DRX-ON state according to the wake up indication, where a DRX-OFF state is maintained before the wake up indication is received.

It is to be noted that the UE may maintain the DRX-OFF state, and entering the DRX-ON state when it is necessary to enter the DRX-ON state, for example, when the wake up indication is received can reduce the power consumption of the UE.

In an implementation, the method further includes switching the first carrier in the power saving state to a non-power saving state.

It is to be noted that in order to avoid a carrier from being unable to be switched to other states due to being in the power saving state for a long time, the carrier in the power saving state may also be switched to the non-power saving state. For example, in some cases, it is necessary to switch the carrier to the non-power saving state in order to improve the efficiency of data scheduling. Additionally, in an optional implementation, the manner of switching a carrier to a power saving state described in this embodiment is also applicable to switching the carrier in the power saving state to a non-power saving state. For example, switching a carrier to a non-power saving state may be performing state switching on a first bandwidth part currently activated in the first carrier and switching the first bandwidth part to the non-power saving state, or switching a bandwidth part currently activated and on the carrier to another bandwidth part on the carrier, where another bandwidth part has a lower power saving level than the bandwidth part. For example, in the case where a bundle relationship is configured between the first carrier and the second carrier, the second carrier may also be switched to the non-power saving state when the first carrier is switched to the non-power saving state, or the second carrier may also be switched to the first designated state when the first carrier is switched to the first designated state, or the second carrier may also be switched to the second designated state when the first carrier is switched to the second designated state. In addition to the preceding exemplary manners, switching the carrier in the power saving state to the non-power saving state is analogous to other manners that are applicable to switching the carrier to the power saving state described in the embodiments of the present disclosure. Details are not repeated here.

In an implementation, the step of switching the first carrier in the power saving state to the non-power saving state includes a step described below.

In a case where a third timer expires, the first carrier in the power saving state is switched to the non-power saving state, where the third timer is triggered and started after the first carrier is switched to the power saving state; or in a case where a switching indication is received, the first carrier in the power saving state is switched to the non-power saving state.

In an implementation, the step of switching the first carrier in the power saving state to the non-power saving state includes a step described below.

After a preset time period starting from a time moment when a second preset condition is satisfied, the first carrier in the power saving state is switched to the non-power saving state.

Alternatively, in a current slot after a preset time period starting from a time moment when a second preset condition is satisfied, the first carrier in the power saving state is switched to the non-power saving state.

Alternatively, in a next slot after a preset time period starting from a time moment when a second preset condition is satisfied, the first carrier in the power saving state is switched to the non-power saving state.

The second preset condition is satisfied for indicating the switching of the first carrier in the power saving state to the non-power saving state.

In an implementation, the preset time period of time is n symbols, n is a positive integer and n is set according to sub-carrier spacing.

This embodiment further provides a method for sending information. FIG. 3 is a flowchart of a method for sending information according to an embodiment of the present disclosure. As shown in FIG. 3, the method includes a step described below.

In step S301, first power saving indication information is sent to a terminal, where the first power saving indication information is configured for indicating that a first carrier currently activated is to be switched to a power saving state by the terminal.

According to the embodiment of the present disclosure, in the case where the first preset condition is satisfied, the first carrier currently activated is switched to the power saving state, where the first preset condition is satisfied for indicating the power saving operation to be performed. Therefore, the problem of high power consumption of the terminal in the related art can be solved, and the effects of reducing delay and power consumption of the terminal can be achieved.

In an implementation, the first power saving indication information being configured for instructing the terminal to switch the first carrier currently activated to the power saving state includes: the first power saving indication information being configured for instructing the terminal to perform state switching on a first bandwidth part currently activated in the first carrier and switch the first bandwidth part to the power saving state; or the first power saving indication information being configured for instructing the terminal to switch a first bandwidth part currently activated in the first carrier to a second bandwidth part in the first carrier, where the second bandwidth part has a higher power saving level than the first bandwidth part.

In an implementation, the method further includes configuring a dormant state, where the dormant state is configured for indicating that the first bandwidth part is to be switched to the dormant state by the terminal in a case where the first power saving indication information is received. The power saving state includes the dormant state.

In an implementation, the method further includes configuring a bundle relationship for a carrier, where the bundle relationship is configured for indicating that a second carrier is to be switched to the power saving state by the terminal in a case where the first carrier is switched to the power saving state. A bundle relationship is configured between the first carrier and the second carrier.

In an implementation, the bundle relationship is further configured for: in a case where the first carrier is switched to a first designated state, indicating that the second carrier is to be switched to the first designated state by the terminal and/or the bundle relationship is further configured for: in a case where the first carrier is switched to a second designated state, indicating that the second carrier is to be switched to the second designated state by the terminal.

In an implementation, the first power saving indication information is further configured for indicating that a second carrier is to be switched to the power saving state, where the first carrier and the second carrier belong to a same terminal.

In an implementation, the method further includes configuring a bit corresponding to a designated carrier in the first power saving indication information, where the bit is configured for indicating that a corresponding operation is to be performed on the designated carrier by the terminal.

In an implementation, the bit is configured for indicating that at least one of the following operations is to be performed by the terminal on the designated carrier: changing a state of the designated carrier, not changing a state of the designated carrier, switching a bandwidth part on the designated carrier, not switching a bandwidth part on the designated carrier, performing a control channel monitoring operation on the designated carrier or not performing a control channel monitoring operation on the designated carrier.

In an implementation, the first power saving indication information is downlink control information carrying a power saving indication identifier.

In an implementation, the method further includes configuring a shared search space or a self-scheduled search space; and sending the first power saving indication information on the configured self-scheduled search space or the configured shared search space.

In an implementation, the first power saving indication information is RRC signaling or a MAC CE.

In an implementation, the method further includes configuring a first timer, where the first timer is configured for indicating whether the shared search space or the self-scheduled search space is enabled. The first timer is activated in DRX-ON duration.

In an implementation, the self-scheduled search space is enabled while the first timer is in operation; and the shared search space is enabled after the first timer expires.

In an implementation, the method further includes sending a wake up indication to the terminal, where the wake up indication is configured for instructing the terminal to enter a DRX-ON state after receiving the wake up indication. The terminal maintains a DRX-OFF state before receiving the wake up indication.

In an implementation, the method further includes sending a switching indication to the terminal, where the switching indication is configured for instructing the terminal to switch the first carrier in the power saving state to a non-power saving state.

In an implementation, the method further includes configuring a third timer, where the third timer is configured for: in a case where the third timer expires, instructing the terminal to switch the first carrier in the power saving state to a non-power saving state. The third timer is triggered and started after the first carrier is switched to the power saving state.

From the description of the preceding implementations, it may be understood clearly by those skilled in the art that the method of the embodiment described above may be implemented by means of software plus a necessary general-purpose hardware platform, or may be implemented by hardware. Based on this understanding, the present disclosure may be embodied in the form of a software product. The computer software product is stored in a storage medium (such as a read-only memory (ROM)/random-access memory (RAM), a magnetic disk or an optical disk) and includes several instructions for enabling a terminal device (which may be a mobile phone, a computer, a server, a network device or the like) to perform the method according to each embodiment of the present disclosure.

Embodiment Two

This embodiment further provides an apparatus for saving power. The apparatus is used for implementing the embodiments and optional implementations described above. What has been described is not repeated. As used below, the term "module" may be software, hardware or a combination of software and hardware capable of implementing predetermined functions. The apparatus described below in this embodiment is implemented by software, but implementation by hardware or by a combination of software and hardware is also possible and conceived.

FIG. 4 is a block diagram illustrating a structure of an apparatus for saving power according to an embodiment of the present disclosure. As shown in FIG. 4, the apparatus includes a first switching module 42.

The first switching module 42 is configured to: in a case where a first preset condition is satisfied, switch a first carrier currently activated to a power saving state. The first preset condition is satisfied for indicating a power saving operation to be performed.

In an implementation, the first switching module 42 includes a first switching sub-module or a second switching sub-module.

The first switching sub-module is configured to perform state switching on a first bandwidth part currently activated in the first carrier and switch the first bandwidth part to the power saving state.

The second switching sub-module is configured to switch a first bandwidth part currently activated in the first carrier to a second bandwidth part in the first carrier. The second bandwidth part has a higher power saving level than the first bandwidth part.

In an implementation, the first switching sub-module includes a first switching unit configured to switch the first bandwidth part to a dormant state. In a case where the first bandwidth part is in the dormant state, a dormant operation is performed on the first bandwidth part.

In an implementation, the dormant operation includes not performing a control channel monitoring operation on the first bandwidth part, and performing at least one of CSI measurement, AGC or beam management.

In an implementation, the first switching module further includes a third switching sub-module configured to: in a case where the first carrier is switched to the power saving state, switch a second carrier to the power saving state. A bundle relationship is configured between the first carrier and the second carrier.

In an implementation, the third switching sub-module includes a second switching unit and/or a third switching unit.

The second switching unit is configured to: in a case where the first carrier is switched to a first designated state, switch the second carrier to the first designated state.

The third switching unit is configured to: in a case where the first carrier is switched to a second designated state, switch the second carrier to the second designated state.

In an implementation, the third switching sub-module further includes a fourth switching unit or a fifth switching unit.

The fourth switching unit is configured to: in the case where the first carrier is switched to the power saving state, switch a third bandwidth part currently activated in the second carrier to the power saving state.

The fifth switching unit is configured to: in the case where the first carrier is switched to the power saving state, switch a third bandwidth part currently activated in the second carrier to a fourth bandwidth part in the second carrier. The fourth bandwidth part has a higher power saving level than the third bandwidth part.

In an implementation, the third switching sub-module further includes a sixth switching unit configured to: in a case where a primary carrier is switched to the power saving state, switch a secondary carrier to the power saving state.

In an implementation, the sixth switching unit includes a first switching sub-unit configured to: in a case where the primary carrier is switched to a first power saving level, switch the secondary carrier to a second power saving level. The second power saving level is higher than or equal to the first power saving level.

In an implementation, the first preset condition is that first power saving indication information is received, and the first power saving indication information is configured for indicating that the first carrier is to be switched to the power saving state.

In an implementation, the first power saving indication information is further configured for indicating switching of a second carrier to the power saving state, where the first carrier and the second carrier belong to a same terminal.

In an implementation, a bit corresponding to a designated carrier is configured in the first power saving indication information, where the bit is configured for indicating that a corresponding operation is to be performed on the designated carrier.

In an implementation, the bit is configured for indicating that at least one of the following operations is to be performed on the designated carrier: changing a state of the designated carrier, not changing a state of the designated carrier, switching a bandwidth part on the designated carrier, not switching a bandwidth part on the designated carrier, performing a control channel monitoring operation on the designated carrier or not performing a control channel monitoring operation on the designated carrier.

In an implementation, the first power saving indication information is downlink control information carrying a power saving indication identifier.

In an implementation, the first power saving indication information is received in a shared search space or a self-scheduled search space.

In an implementation, the first power saving indication information further carries at least one of:
a first identifier for indicating whether the shared search space is enabled; or
a second identifier for indicating whether the self-scheduled search space is enabled.

In an implementation, the first power saving indication information is RRC signaling or a MAC CE.

In an implementation, the apparatus for saving power in this embodiment further includes a determination module configured to determine, according to whether a first timer expires, whether the shared search space or the self-scheduled search space is enabled. The first timer is activated in DRX-ON duration.

In an implementation, the self-scheduled search space is enabled while the first timer is in operation; and the shared search space is enabled after the first timer expires.

In an implementation, the preset condition is that a second timer expires, and the second timer is configured for indicating the switching of the first carrier to the power saving state.

In an implementation, the apparatus for saving power in this embodiment further includes a receiving module and a wake up module.

The receiving module is configured to receive a wake up indication before the first carrier currently activated is switched to the power saving state.

The wake up module is configured to enter a DRX-ON state according to the wake up indication. A DRX-OFF state is maintained before the wake up indication is received.

In an implementation, the apparatus for saving power in this embodiment further includes a second switching module configured to switch the first carrier in the power saving state to a non-power saving state.

In an implementation, the second switching module includes a fourth switching sub-module or a fifth switching sub-module.

The fourth switching sub-module is configured to: in a case where a third timer expires, switch the first carrier in the power saving state to the non-power saving state. The third timer is triggered and started after the first carrier is switched to the power saving state.

The fifth switching sub-module is configured to: in a case where a switching indication is received, switch the first carrier in the power saving state to the non-power saving state.

In an implementation, the second switching module further includes a sixth switching sub-module, a seventh switching sub-module or an eighth switching sub-module.

The sixth switching sub-module is configured to: after a preset time period starting from a time moment when a second preset condition is satisfied, switch the first carrier in the power saving state to the non-power saving state.

The seventh switching sub-module is configured to: in a current slot after a preset time period starting from a time moment when a second preset condition is satisfied, switch the first carrier in the power saving state to the non-power saving state.

The eighth switching sub-module is configured to: in a next slot after a preset time period starting from a time moment when a second preset condition is satisfied, switch the first carrier in the power saving state to the non-power saving state.

The second preset condition is satisfied for indicating the switching of the first carrier in the power saving state to the non-power saving state.

In an implementation, the preset time period of time is n symbols, n is a positive integer and n is set according to sub-carrier space.

This embodiment further provides an apparatus for sending information. The apparatus is used for implementing the above-mentioned embodiments and optional implementations. What has been described will not be repeated. As used below, the term "module" may be software, hardware or a combination of software and hardware capable of implementing predetermined functions. The apparatus described below in this embodiment is implemented by software, but implementation by hardware or by a combination of software and hardware is also possible and conceived.

Figure 5:
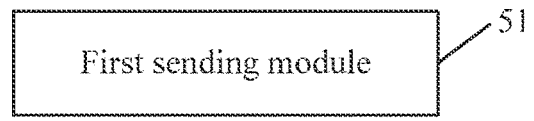
FIG. 5 is a block diagram illustrating a structure of an apparatus for sending information according to an embodiment of the present disclosure.

FIG. 5 is a block diagram illustrating a structure of an apparatus for sending information according to an embodiment of the present disclosure. As shown in FIG. 5, the apparatus includes a first sending module 51.

The first sending module 51 is configured to send first power saving indication information to a terminal. The first power saving indication information is configured for indicating that a first carrier currently activated is to be switched to a power saving state by the terminal.

In an implementation, the first power saving indication information being configured for instructing the terminal to switch the first carrier currently activated to the power saving state includes what is described below.

The first power saving indication information is configured for indicating that state switching is to be performed on a first bandwidth part currently activated in the first carrier by the terminal and the first bandwidth part is switched to the power saving state.

Alternatively, the first power saving indication information is configured for indicating that a first bandwidth part currently activated in the first carrier is to be switched to a second bandwidth part in the first carrier by the terminal. The second bandwidth part has a higher power saving level than the first bandwidth part.

In an implementation, the apparatus for sending information in this embodiment further includes a first configuration module configured to configure a dormant state. The dormant state is configured for: in a case where the first power saving indication information is received, instructing the terminal to switch the first bandwidth part to the dormant state. The power saving state includes the dormant state.

In an implementation, the apparatus for sending information in this embodiment further includes a second configuration module configured to configure a bundle relationship for a carrier. The bundle relationship is configured for: in a case where the first carrier is switched to the power saving state, instructing the terminal to switch a second carrier to the power saving state. A bundle relationship is configured between the first carrier and the second carrier.

In an implementation, the bundle relationship is further configured for: in a case where the first carrier is switched to a first designated state, instructing the terminal to switch the second carrier to the first designated state; and/or the bundle relationship is further configured for: in a case where the first carrier is switched to a second designated state, instructing the terminal to switch the second carrier to the second designated state.

In an implementation, the first power saving indication information is further configured for indicating switching of a second carrier to the power saving state, where the first carrier and the second carrier belong to a same terminal.

In an implementation, the apparatus for sending information in this embodiment further includes a third configuration module configured to configure a bit corresponding to a designated carrier in the first power saving indication information. The bit is configured for instructing the terminal to perform a corresponding operation on the designated carrier.

In an implementation, the bit is configured for indicating that at least one of the following operations is to be performed by the terminal on the designated carrier: changing a state of the designated carrier, not changing a state of the designated carrier, switching a bandwidth part on the designated carrier, not switching a bandwidth part on the designated carrier, performing a control channel monitoring operation on the designated carrier or not performing a control channel monitoring operation on the designated carrier.

In an implementation, the first power saving indication information is downlink control information carrying a power saving indication identifier.

In an implementation, the apparatus for sending information in this embodiment further includes a fourth configuration module configured to configure a shared search space or a self-scheduled search space and a first sending module configured to send the first power saving indication information on the configured self-scheduled search space or the configured shared search space.

In an implementation, the first power saving indication information is RRC signaling or a MAC CE.

In an implementation, the apparatus for sending information in this embodiment further includes a fifth configuration module configured to configure a first timer. The first timer is configured for indicating whether the shared search space or the self-scheduled search space is enabled. The first timer is activated in DRX-ON duration.

In an implementation, the self-scheduled search space is enabled while the first timer is in operation; and the shared search space is enabled after the first timer expires.

In an implementation, the apparatus for sending information in this embodiment further includes a second sending module configured to send a wake up indication to the terminal. The wake up indication is configured for instructing the terminal to enter a DRX-ON state after receiving the wake up indication. The terminal maintains a DRX-OFF state before receiving the wake up indication.

In an implementation, the apparatus for sending information in this embodiment further includes a third sending module configured to send a switching indication to the terminal. The switching indication is configured for instructing the terminal to switch the first carrier in the power saving state to a non-power saving state.

In an implementation, the apparatus for sending information in this embodiment further includes a sixth configuration module configured to configure a third timer. The third timer is configured for: in a case where the third timer expires, instructing the terminal to switch the first carrier in the power saving state to a non-power saving state. The third timer is triggered and started after the first carrier is switched to the power saving state.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiments of the present disclosure are described below in detail in conjunction with specific scenarios.

Discontinuous receiving (DRX) refers to that a UE does not continuously receive signals or/and channels transmitted by a base station. The base station may configure a DRX cycle and an offset for each UE. In one DRX cycle, the UE is required to receive signals or/and channels transmitted by the base station in the DRX-ON duration but is not required to perform receiving in the DRX-OFF duration.

In a carrier aggregation (CA) scenario, one UE has merely one MAC entity, so all cells share one DRX configuration. In a dual connection (DC) scenario, a master cell group (MCG) and a secondary cell group (SCG) each correspond to one MAC entity, and each cell group shares one DRX configuration. That is, when data is scheduled on one activated cell and drx-InactivityTimer is activated, the PDCCH monitoring time on all activated cells in the same cell group is prolonged.

It is to be noted that the "dormant state", "state in which power is saved", "state in which power is not saved" and "normal state" in the following embodiments merely list several different state types. Each of these types of states has its own characteristics, corresponds to different power consumption and may be understood as the "power saving state" under a different circumstance in the preceding embodiments. For example, when no data is transmitted on a carrier, the carrier is switched from the current "state in which power is not saved" to the "state in which power is saved", or the carrier is switched from the current "state in which power is saved" to the "dormant state", which may both be understood as the carrier being switched from the current state to the "power saving state". For example, when data is transmitted on the carrier, the carrier is switched from the current "state in which power is saved" to the "state in which power is not saved", or the carrier is switched from the current "dormant state" to the "state in which power is saved", which may both be understood as the carrier being switched from the current state to the "power saving state". For example, when data scheduling is required, the "state in which power is not saved" having a higher data transmission rate can be used for quick data scheduling and has less power consumption than the "state in which power is saved" used for data scheduling for a longer time.

The power saving method provided in the embodiment of the present disclosure may be as follows: receiving a power saving signal or a power saving channel and performing an operation on a serving cell (that is, carrier). Performing the operation on the serving cell may be performing BWP state switching or BWP switching on a bandwidth part (BWP) in the serving cell.

In an implementation, when the UE successfully detects a power saving signal or a power saving channel, the UE performs switching from the current BWP to a non-power saving BWP.

In an implementation, the current BWP is a power saving BWP, the power saving BWP has certain power saving characteristics, a non-power saving BWP is a BWP configured with cross-slot scheduling, and the power saving BWP is the BWP having the maximum PDCCH monitoring cycle.

In an implementation, the current BWP is a non-power saving BWP, the non-power saving BWP is a BWP configured with same-slot scheduling, and the non-power saving BWP is the BWP having the minimum PDCCH monitoring cycle. In an implementation, the power saving signal or the power saving channel is detected by the UE in a PCell. The power saving signal or the power saving channel may also be detected by the UE in an SCell.

In an implementation, the UE performs BWP switching according to the power saving signal or the power saving channel, and the UE performs BWP state switching according to the power saving signal or the power saving channel.

In an implementation, a BWP in the SCell may be in a variety of states such as an active state, an inactive state and a dormant state. A dormancy behavior can be implemented in the BWP dormant state. In an implementation, the delay for BWP state switching is n symbols. n is related to sub-carrier space.

In an implementation, the base station may have the same operation as a designated carrier. The same operation may be that when switching is performed from the BWP dormant state to the BWP active state in one serving cell, switching is also performed from the BWP dormant state to the BWP active state in another serving cell.

In an implementation, the monitoring of a search space is performed on the serving cell according to the power saving signal or the power saving channel.

In an implementation, the BWP switching includes that: the UE performs a BWP switching operation on a designated carrier whose currently activated BWP is a dormant BWP; and the BWP switching operation includes switching from the dormant BWP to a power saving BWP. The BWP switching operation includes switching from a dormant BWP to a normal BWP. The BWP switching may further include the following: a pre-window operation is required to be performed when the UE performs switching from a dormant BWP to a power saving BWP; CSI is required to be reported when the UE performs switching from a dormant BWP to a power saving BWP; a pre-window operation is required to be performed when the UE performs switching from a dormant BWP to a normal BWP; and CSI is required to be reported when the UE switches from a dormant BWP to a normal BWP. The normal BWP refers to a BWP on which PDCCH monitoring and data receiving can be normally performed.

In an implementation, the BWP switching includes the following: a pre-window operation is required to be performed when the UE performs switching from a power saving BWP to a normal BWP; and CSI is required to be reported when the UE performs switching from the power saving BWP to the normal BWP.

In an implementation, when the UE successfully detects a power saving signal or a power saving channel, the UE performs switching from a BWP dormant state to a BWP active state.

In an implementation, a pre-window operation is required to be performed when the UE performs switching from a dormant state to an active state; and CSI is required to be reported when the UE performs switching from the dormant state to the active state.

In an implementation, the UE performs an operation according to the bit indication of a power saving signal or a power saving channel. The operation includes an operation on a serving cell and/or an operation on a BWP, for example, a state change of an SCell, BWP switching and whether normal PDCCH monitoring is performed on an SCell.

n bits may be configured in the power saving signal or the power saving channel for triggering the operation of the UE on a secondary carrier. For example, it may be indicated that the SCell is to be switched to/maintain the dormancy behavior in the next arriving DRX-ON duration; or PDCCH monitoring is normally performed in the SCell in the next DRX-ON duration in preparation for data receiving; or the SCell skips the upcoming DRX-ON duration.

In an implementation, the power saving signal or the power saving channel reuses a carrier indicator bit field to indicate the operation of the UE. For example, it may be indicated that the SCell is to be switched to/maintain the dormancy behavior through the UE in the next arriving DRX-ON duration. The dormancy behavior can be implemented through switching of a BWP to a dormant BWP. The dormancy behavior can be implemented through switching of the BWP from an active state to a dormant state.

In an implementation, the UE performs an operation on a serving cell according to a timer or a specific length of time; or the UE performs an operation on an S Cell according to a timer or a specific length of time; or the UE performs an operation on a BWP according to a timer or a specific length of time.

In an implementation, the UE performs a power saving operation on an SCell that has not been scheduled for a period of time in the DRX-ON duration (or DRX active time). For example, the operation may be switching from the currently activated BWP to a default BWP, or switching from a currently activated BWP to an initial BWP, or switching from a currently activated BWP to a dormant BWP or switching from a current BWP active state to a BWP dormant state.

In an implementation, a bundle relationship may exist between BWPs on two or more carriers. The bundle relationship includes the following: BWP switching on one serving cell causes BWP switching on some serving cells; or switching of a specific BWP on one serving cell causes switching of specific BWPs on some serving cells. For example, when one carrier is switched to the BWP having the maximum transmission rate, another carrier is also switched to the BWP having the maximum transmission rate. For example, when one carrier is switched to a BWP having low power consumption, another carrier is also switched to a BWP having low power consumption. It is to be noted that when one carrier is switched to the BWP having the maximum transmission rate, another carrier may not be subjected to BWP switching, but a bwp-Inactivity-Timer is reactivated. Alternatively, when one carrier is switched to the BWP having low power consumption, another carrier may not be subjected to BWP switching, but a bwp-InactivityTimer is reactivated.

In an implementation, the UE performs BWP state switching according to a timer. For example, switching between the BWP active state, the BWP dormant state and the default/initial BWP is performed through a timer. For example, when a bwpDormancyTimer expires, the currently activated BWP is switched from an active state to a dormant state.

In an implementation, the UE monitors a search space according to a power saving signal or a power saving channel. For example, after the power saving signal or the power saving channel is received, the UE performs PDCCH monitoring merely on a shared search space. Alternatively, after the power saving signal or the power saving channel is received, the UE performs self-scheduled search space monitoring on a secondary carrier. Alternatively, after the power saving signal or the power saving channel is received, the UE performs PDCCH monitoring on a secondary carrier. Alternatively, after the power saving signal or the power saving channel is received, the UE performs self-scheduled PDCCH monitoring on a secondary carrier.

In an implementation, the UE monitors a search space according to indication in the bit field of a power saving signal or a power saving channel; and the UE monitors the search space according to a MAC CE or RRC signaling or a Timer. The monitoring of the search space may be as follows: after the bit field of the power saving signal or the power saving channel is received, the UE searches for a PDCCH merely on a shared space; or after the MAC CE is received, the UE searches for a PDCCH merely on a shared space; or after the RRC signaling is received, the UE searches for a PDCCH merely on a shared space; or after the Timer expires, the UE searches for a PDCCH merely on a shared space.

Optional Implementation One

This embodiment mainly describes how a user equipment (UE) switches a BWP according to a power saving signal or a power saving channel transmitted by a base station. The power saving signal or the power saving channel may be a signal/channel having a wake up function, such as being referred to as a WUS. WUS is short for Wake Up Signal.

Steps executed at the base station side are described below.

The base station configures DRX for the UE.

The base station sends a power saving signal or a power saving channel to a primary carrier (i.e. primary cell, PCell) of the UE. The power saving signal or the power saving channel may be a signal having a wake up function carried in the PDCCH, such as a WUS-PDCCH. The wake up signal appears before the DRX-ON duration. If the UE detects the WUS-PDCCH, the UE wakes up in the next DRX-ON duration, performs PDCCH monitoring, and prepares to receive or send data. If the WUS-PDCCH is not successfully detected, the UE skips the next (or more) DRX-ON duration and maintains the DRX-OFF state.

The base station configures a power saving BWP (the BWP corresponding to a certain bwp-Id is designated as the power saving BWP) for the PCell. The power saving BWP has one or more power saving characteristics. Optionally, the power saving BWP has a small bandwidth (the smallest bandwidth among those of the BWPs configured on the PCell). Optionally, the power saving BWP has a small number of MIMO layers (the smallest number of MIMO layers among those of the BWPs configured on the PCell). Optionally, the power saving BWP has a large PDCCH monitoring cycle (the largest PDCCH monitoring cycle among those of the BWPs configured on the PCell). Optionally, the power saving BWP is configured with cross-slot scheduling (embodied in the setting of related parameters K0, K1, K2 and aperiodic channel state information reference signal (A-CSI-RS) triggering offset to numbers greater than 0).

Steps executed at the terminal side are described below.

In the outside active time on a PCell, a UE receives a power saving signal or a power saving channel sent by a base station. When the UE successfully detects the power saving signal or the power saving channel, the UE performs certain operations. The operations include receiving a reference signal (for example, a channel state information reference signal (CSI-RS)) transmitted by the base station, sending a CSI report, sending a certain signal or a certain channel, performing BWP switching, and the like. The operations are mainly described below.

If a power saving signal or a power saving channel is successfully detected on the PCell, optionally, the UE performs a pre-window operation (including that the UE receives a CSI-RS transmitted by the base station, that the UE sends a CSI report, and that the UE transmits a sounding reference signal (SRS)) before the upcoming DRX-ON duration on the PCell or within a period of time early in the DRX-ON duration. During the pre-window period, the user equipment (UE) is required to be ready to receive data transmitted by the base station or transmit data to the base station (that is, the UE is ready to receive a PDSCH and send a PUSCH).

When the UE successfully detects the power saving signal or the power saving channel, the UE performs BWP switching. For example, if the UE successfully detects a power saving signal or a power saving channel on the PCell, optionally, the UE determines whether the BWP currently activated and on the PCell is a power saving BWP. If the BWP currently activated and on the PCell is a non-power saving BWP, the UE does not perform any operation on the PCell. If the currently activated BWP on the PCell is a power saving BWP, the UE performs a BWP switching operation on the PCell, and the switching is from the current power saving BWP to a non-power saving BWP. When multiple non-power saving BWPs are provided, optionally, the current power saving BWP may be switched to the BWP having the smallest BWP ID number other than the power saving BWP. Optionally, the current power saving BWP may be switched to the BWP having the largest BWP ID number other than the power saving BWP. Optionally, the current power saving BWP may be switched to the BWP having the next BWP ID number (cyclically, for example, 1, 2, 3, 0, 1 . . . ). Optionally, the current power saving BWP may be switched to the BWP where data was received/transmitted last time. Optionally, the current power saving BWP may be switched to the BWP configured with the maximum bandwidth. Optionally, the current power saving BWP may be switched to the BWP configured with the largest number of MIMO layers. Optionally, the current power saving BWP may be switched to the BWP having the smallest PDCCH monitoring cycle.

When the UE successfully detects the power saving signal or the power saving channel, the UE performs BWP switching and a pre-window operation. For example, if the UE successfully detects a power saving signal or a power saving channel on the PCell, optionally, the UE determines whether the BWP currently activated on the PCell is a power saving BWP. If the BWP currently activated on the PCell is a non-power saving BWP, the UE performs a pre-window operation on the PCell. If the currently activated BWP on the PCell is a power saving BWP, the UE performs a BWP switching operation on the PCell, the switching is from the current power saving BWP to a non-power saving BWP, and a pre-window operation is performed after the BWP switching is completed. When multiple non-power saving BWPs are provided, optionally, the current power saving BWP may be switched to the BWP having the smallest BWP ID number other than the power saving BWP. Optionally, the current power saving BWP may be switched to the BWP having the largest BWP ID number other than the power saving BWP. Optionally, the current power saving BWP may be switched to the BWP having the next BWP ID number (cyclically, for example, 1, 2, 3, 0, 1 . . . ). Optionally, the current power saving BWP may be switched to the BWP where data was received/transmitted last time. Optionally, the current power saving BWP may be switched to the BWP configured with the maximum bandwidth. Optionally, the current power saving BWP may be switched to the BWP configured with the largest number of MIMO layers. During the pre-window period, the user equipment (UE) is required to be ready to receive data transmitted by the base station or transmit data to the base station.

Optional Implementation Two

This embodiment mainly describes how a UE switches a BWP or a BWP state according to a power saving signal or a power saving channel sent by a base station. Optionally, the BWP is switched between a dormant state and an active state.

Steps executed at the base station side are described below.

The base station configures DRX for the UE.

The base station configures multiple carriers for the UE.

The base station sends a power saving signal or a power saving channel to a PCell. The power saving signal or the power saving channel may be a signal having a wake up function carried in the PDCCH, such as a WUS-PDCCH. The wake up signal appears before the DRX-ON duration. If the UE detects the WUS-PDCCH, the UE wakes up in the next DRX-ON duration, performs PDCCH monitoring, and prepares to receive or send data. If the WUS-PDCCH is not successfully detected, the UE skips the next (or more) DRX-ON duration and maintains the DRX-OFF state.

The base station configures a power saving BWP (the BWP corresponding to a certain bwp-Id is designated as the power saving BWP) for a primary carrier (i.e. PCell) and a secondary carrier (i.e. SCell). The power saving BWP has one or more power saving characteristics. Optionally, the power saving BWP has a small bandwidth (the smallest bandwidth among those of the BWPs configured on the carrier). Optionally, the power saving BWP has a small number of MIMO layers (the smallest number of MIMO layers among those of the BWPs configured on the carrier). Optionally, the power saving BWP has a large PDCCH monitoring cycle (the largest PDCCH monitoring cycle among those of the BWPs configured on the carrier). Optionally, the power saving BWP is configured with crossslot scheduling (embodied in the setting of related parameters K0, K1, K2 and A-CSI-RS triggering offset to numbers greater than 0).

The base station may configure a dormant BWP for the SCell. On such BWP, the UE does not perform PDCCH monitoring but still performs CSI measurement, AGC, beam management and the like.

The base station may configure a BWP dormant state for the SCell. That is, one BWP may have three states: an active state, an inactive state and a dormant state. A dormancy behavior can be implemented in the BWP dormant state. On the BWP in the dormant state, the UE does not perform PDCCH monitoring but still performs CSI measurement, AGC, beam management and the like.

The base station designates carriers having the same operation (referring to switching between multiple BWP states). Optionally, the designated carriers are a primary carrier and all secondary carriers. Optionally, the designated carriers are a primary carrier and part of the secondary carriers. Optionally, the designated carriers are all secondary carriers. Optionally, the designated carriers are part of the secondary carriers.

Steps executed at the terminal side are described below.

In the outside active time on a PCell, a UE receives a power saving signal or a power saving channel sent by a base station.

Optionally, if the UE successfully detects the power saving signal on the PCell, a pre-window operation (that the UE receives a CSI-RS transmitted by the base station, that the UE sends a CSI report, and that the UE transmits an SRS) is performed on a designated carrier. During the pre-window period, the user equipment (UE) is required to be ready to receive data transmitted by the base station or transmit data to the base station (that is, the UE is ready to receive a PDSCH and send a PUSCH). The designated carrier is a carrier designated by the base station and having the same operation.

The UE may perform BWP switching or/and state switching according to the power saving signal or the power saving channel. Optionally, (the WUS implicitly indicates that the dormant BWP on the designated carrier is switched to the power saving BWP), if the power saving signal is successfully detected on the PCell, the UE first determines whether the currently activated BWP on the designated carrier is a dormant BWP. The designated carrier is a carrier designated by the base station and having the same operation. If the BWP currently activated on the designated carrier is a non-dormant BWP, no operation is performed on the carrier. If the BWP currently activated on the designated carrier is a dormant BWP, a BWP switching operation is performed on the designated carrier. The current dormant BWP is switched to a power saving BWP.

The UE may perform an operation on the carrier (or serving cell) according to the power saving signal or the power saving channel. Optionally, (the WUS implicitly indicates that the dormant BWP on the designated carrier is switched to the BWP on which PDCCH monitoring and data receiving can be normally performed), if the power saving signal is successfully detected on the PCell, the UE first determines whether the currently activated BWP on the designated carrier is a dormant BWP. The designated carrier is a carrier designated by the base station and having the same operation. If the BWP currently activated on the designated carrier is a non-dormant BWP, no operation is performed on the carrier. If the BWP currently activated on the designated carrier is a dormant BWP, a BWP switching operation is performed on the designated carrier. The current dormant BWP is switched to the BWP on which PDCCH monitoring and data receiving can be normally performed. When multiple BWPs are provided, optionally, the current dormant BWP may be switched to the BWP having the smallest BWP ID number. Optionally, the current dormant BWP may be switched to the BWP having the largest BWP ID number. Optionally, the current dormant BWP may be switched to the BWP having the next BWP ID number (cyclically, for example, 1, 2, 3, 0, 1 . . . ). Optionally, the current dormant BWP may be switched to the BWP where data was received/transmitted last time. Optionally, the current dormant BWP may be switched to the BWP configured with the maximum bandwidth. Optionally, the current dormant BWP may be switched to the BWP configured with the largest number of MIMO layers. Optionally, the current dormant BWP may be switched to the BWP having the smallest PDCCH monitoring cycle.

Optionally, the WUS implicitly indicates that the power saving BWP on the designated carrier is switched to the BWP on which PDCCH monitoring and data receiving can be normally performed. Optionally, if the power saving signal is successfully detected on the PCell, the UE first determines whether the currently activated BWP on the designated carrier is a power saving BWP. The designated carrier is a carrier designated by the base station and having the same operation. If the BWP currently activated on the designated carrier is a non-power saving BWP, no operation is performed on the carrier. If the BWP currently activated on the designated carrier is a power saving BWP, a BWP switching operation is performed on the designated carrier. The current power saving BWP is switched to the BWP on which PDCCH monitoring and data receiving can be normally performed. When multiple BWPs are provided, optionally, the current power saving BWP may be switched to the BWP having the smallest BWP ID number. Optionally, the current power saving BWP may be switched to the BWP having the largest BWP ID number. Optionally, the current power saving BWP may be switched to the BWP having the next BWP ID number (cyclically, for example, 1, 2, 3, 0, 1 . . . ). Optionally, the current power saving BWP may be switched to the BWP where data was received/transmitted last time. Optionally, the current power saving BWP may be switched to the BWP configured with the maximum bandwidth. Optionally, the current power saving BWP may be switched to the BWP configured with the largest number of MIMO layers. Optionally, the current power saving BWP may be switched to the BWP having the smallest PDCCH monitoring cycle.

Optionally, the WUS implicitly indicates that the dormant BWP on the designated carrier is switched to the power saving BWP. A pre-window is performed. A pre-window operation is directly performed on a non-dormant BWP on the carrier. Optionally, if the power saving signal is successfully detected on the PCell, the UE first determines whether the currently activated BWP on the designated carrier is a dormant BWP. The designated carrier is a carrier designated by the base station and having the same operation. If the currently activated BWP on the designated carrier is a non-dormant BWP, a pre-window operation is performed on the carrier before the next DRX-ON duration or within a period of time early in the DRX-ON duration. If the BWP currently activated on the designated carrier is a dormant BWP, a BWP switching operation is performed on the designated carrier. The current dormant BWP is switched to the power saving BWP and a pre-window operation is performed on the switched BWP. During the pre-window period, the user equipment (UE) is required to be ready to receive data transmitted by the base station or transmit data to the base station.

Optionally, the WUS implicitly indicates that the dormant BWP on the designated carrier is switched to the BWP on which PDCCH monitoring and data receiving can be normally performed, and a pre-window operation is performed. A pre-window operation is directly performed on a non-dormant BWP on the carrier. Optionally, if the power saving signal is successfully detected on the PCell, the UE first determines whether the currently activated BWP on the designated carrier is a dormant BWP. The designated carrier is a carrier designated by the base station and having the same operation. If the currently activated BWP on the designated carrier is a non-dormant BWP, a pre-window operation is performed on the carrier before the next DRX-ON duration or within a period of time early in the DRX-ON duration. If the BWP currently activated on the designated carrier is a dormant BWP, a BWP switching operation is performed on the designated carrier. The current dormant BWP is switched to the BWP on which PDCCH monitoring and data receiving can be normally performed. When multiple BWPs are provided, optionally, the current dormant BWP may be switched to the BWP having the smallest BWP ID number. Optionally, the current dormant BWP may be switched to the BWP having the largest BWP ID number. Optionally, the current dormant BWP may be switched to the BWP having the next BWP ID number (cyclically, for example, 1, 2, 3, 0, 1 . . . ). Optionally, the current dormant BWP may be switched to the BWP where data was received/transmitted last time. Optionally, the current dormant BWP may be switched to the BWP configured with the maximum bandwidth. Optionally, the current dormant BWP may be switched to the BWP configured with the largest number of MIMO layers. Optionally, the current dormant BWP may be switched to the BWP having the smallest PDCCH monitoring cycle. A pre-window operation is performed on the switched BWP. During the pre-window period, the user equipment (UE) is required to be ready to receive data transmitted by the base station or transmit data to the base station.

Optionally, the WUS implicitly indicates that the power saving BWP on the designated carrier is switched to the BWP on which PDCCH monitoring and data receiving can be normally performed, and a pre-window operation is performed. A pre-window operation is directly performed on a non-power saving BWP on the carrier. Optionally, if the power saving signal is successfully detected on the PCell, the UE first determines whether the currently activated BWP on the designated carrier is a power saving BWP. The designated carrier is a carrier designated by the base station and having the same operation. If the currently activated BWP on the designated carrier is a non-power saving BWP, a pre-window operation is performed on the carrier before the next DRX-ON duration or within a period of time early in the DRX-ON duration. If the BWP currently activated on the designated carrier is a power saving BWP, a BWP switching operation is performed on the designated carrier. The current power saving BWP is switched to the BWP on which PDCCH monitoring and data receiving can be normally performed. When multiple BWPs are provided, optionally, the current power saving BWP may be switched to the BWP having the smallest BWP ID number. Optionally, the current power saving BWP may be switched to the BWP having the largest BWP ID number. Optionally, the current power saving BWP may be switched to the BWP having the next BWP ID number (cyclically, for example, 1, 2, 3, 0, 1 . . . ). Optionally, the current power saving BWP may be switched to the BWP where data was received/transmitted last time. Optionally, the current power saving BWP may be switched to the BWP configured with the maximum bandwidth. Optionally, the current power saving BWP may be switched to the BWP configured with the largest number of MIMO layers. Optionally, the current power saving BWP may be switched to the BWP having the smallest PDCCH monitoring cycle. A pre-window operation is performed on the switched BWP. During the pre-window period, the user equipment (UE) is required to be ready to receive data transmitted by the base station or transmit data to the base station.

Optionally, the WUS implicitly indicates that the BWP dormant state is switched to the BWP active state. Optionally, if the power saving signal is successfully detected on the PCell, the UE first determines whether the currently activated BWP on the designated carrier is in a BWP dormant state. The designated carrier is a carrier designated by the base station and having the same operation. If the BWP currently activated on the designated carrier is in a BWP active state, no operation is performed on the carrier. If the currently activated BWP on the designated carrier is in a BWP dormant state, a BWP state switching operation is performed on the BWP so that the BWP is switched from the current dormant state to the active state.

Optionally, the WUS implicitly indicates that the BWP dormant state is switched to the BWP active state, and a pre-window operation is performed. Optionally, if the power saving signal is successfully detected on the PCell, the UE first determines whether the currently activated BWP on the designated carrier is in a BWP dormant state. The designated carrier is a carrier designated by the base station and having the same operation. If the currently activated BWP on the designated carrier is in a BWP active state, a pre-window operation is performed on the carrier before the next DRX-ON duration or within a period of time early in the DRX-ON duration. If the currently activated BWP on the designated carrier is in a BWP dormant state, a BWP state switching operation is performed on the BWP so that the BWP is switched from the current dormant state to the active state. A pre-window operation is performed after the state switching. During the pre-window period, the user equipment (UE) is required to be ready to receive data transmitted by the base station or transmit data to the base station.

Optional Implementation Three

This embodiment mainly describes that a UE performs operations according to the bit indication of a power saving signal or a power saving channel, the operations including operations on a serving cell and a BWP.

Steps executed at the base station side are described below.

The base station configures DRX for the UE.

The base station configures multiple carriers for the UE.

The base station sends a power saving signal or a power saving channel to a primary carrier (primary cell, PCell) in the outside active time. The power saving signal or the power saving channel may be a signal having a wake up function carried in the PDCCH, such as a WUS-PDCCH. The wake up signal appears before the DRX-ON duration. If the UE detects the WUS-PDCCH, the UE wakes up in the next DRX-ON duration, performs PDCCH monitoring, and prepares to receive or send data. If the WUS-PDCCH is not successfully detected, the UE skips the next (or more) DRX-ON duration and maintains the DRX-OFF state.

The base station may configure a dormant BWP for the SCell(s). On such BWP, the UE does not perform PDCCH monitoring but still performs CSI measurement, AGC, beam management and the like.

The base station may configure a BWP dormant state for the SCell(s). That is, a same BWP may have three states: an active state, an inactive state and a dormant state. A dormancy behavior can be implemented in the BWP dormant state. On the BWP in the dormant state, the UE does not perform PDCCH monitoring but still performs CSI measurement, AGC, beam management and the like.

The base station may configure a Dormant SCell state for the SCell(s). The UE does not perform PDCCH monitoring and does not perform uplink or downlink data transmission on the SCell in this state, but still performs CSI (for example, channel quality indicator (CQI)/precoding matrix indicator (PMI)/rank indication (RI)) measurement.

Steps executed at the terminal side are described below.

The UE performs an operation according to the bit of a power saving signal or a power saving channel. For example, in the outside active time of the PCell, the UE receives the power saving signal or the power saving channel sent by the base station; n (1≤n≤15) bits in the power saving signal or the power saving channel are used for triggering the operation of the UE on a secondary carrier. Optionally, the bits included in the power saving signal or the power saving channel and the correspondence between the bits and SCells are shown in Table 1 below:

TABLE 1

| Number n of bits | Correspondence with an SCell |
| --- | --- |
| 15 | Each bit corresponds to one SCell Id to indicate the operation of the corresponding SCell; Optionally, 15 bits from left (MSB) to right (LSB) correspond to SCell Ids in ascending order, respectively; MSB is the abbreviation for most significant bit; LSB is the abbreviation for least significant bit; Optionally, 15 bits correspond to SCell Ids in descending order from left to right, respectively; |

TABLE 1-continued

| Number n of bits | Correspondence with an SCell |
|---|---|
| | Optionally, 15 bits from left to right correspond to the activated SCell Ids arranged in ascending order and the deactivated SCell Ids arranged in ascending order, respectively; |
| | Optionally, 15 bits from left to right correspond to the activated SCell Ids arranged in descending order and the deactivated SCell Ids arranged in descending order, respectively; |
| | Optionally, the number of currently activated SCells is less than 15, and padding is performed at the corresponding positions of the deactivated SCells; |
| | Optionally, the number of currently activated SCells is less than 15, and the bits at the corresponding positions of the deactivated SCells are empty; |
| 8 | Each bit corresponds to one to two SCell Ids to indicate the operation(s) of the corresponding SCell(s); |
| | Optionally, the i-th bit corresponds to carrier Ids of (2i − 1) and 2i, where i is within a range of 1 to 8; |
| | Optionally, the i-th bit corresponds to carrier Ids of i and (i + 8); |
| | Optionally, the activated SCells and the deactivated SCells are arranged in ascending order of Id and cyclically correspond to the 8 bits (if nine activated SCells exist in total, the first bit corresponds to the activated SCell having the smallest Id and the activated SCell having the largest Id; the second bit corresponds to the activated SCell having the second smallest Id and the deactivated SCell having the smallest Id, and so on); |
| | Optionally, the number of currently activated SCells is less than 8, and padding is performed at the bit positions of the corresponding deactivated carriers; |
| | Optionally, the number of currently activated SCells is less than 8, and the bits of the corresponding deactivated carriers are empty; |
| 5 | Each bit corresponds to three SCell Ids to indicate the operations of the corresponding SCells; |
| | Optionally, the i-th bit corresponds to carrier Ids of (3i − 1), (3i − 2) and 3i, where i is within a range of 1 to 5; |
| | Optionally, the i-th bit corresponds to carrier Ids of i, (i + 5) and (i + 10); |
| | Optionally, the activated SCells and the deactivated SCells are arranged in ascending order of Id and cyclically correspond to the 5 bits; |
| | Optionally, the number of currently activated SCells is less than 5, and padding is performed at the bit positions of the corresponding deactivated carriers; |
| | Optionally, the number of currently activated SCells is less than 5, and the bits of the corresponding deactivated carriers are empty; |
| 3 | Each bit corresponds to five SCell Ids to indicate the operations of the corresponding SCells; |
| | Optionally, the i-th bit corresponds to carrier Ids of (5i − 1), (5i − 2), (5i − 3), (5i − 4) and 5i, where i is within a range of 1 to 3; |
| | Optionally, the i-th bit corresponds to carrier Ids of i, (i + 3), (i + 6), (i + 9) and (i + 12); |
| | Optionally, the activated SCells and the deactivated SCells are arranged in ascending order of Id and cyclically correspond to the 3 bits; |
| | Optionally, the number of currently activated SCells is less than 3, and padding is performed at the bit positions of the corresponding deactivated carriers; |
| | Optionally, the number of currently activated SCells is less than 3, and the bits of the corresponding deactivated carriers are empty. |

The operations indicated by the indication bits mainly include a SCell state change, BWP switching, and whether normal PDCCH monitoring is performed, as described below.

Optionally, the meaning of the bit indicated by the power saving signal or the power saving channel is as follows: "0" indicates that the dormancy behavior is switched to/maintained in the SCell corresponding to the bit "0" in the upcoming DRX-ON duration; "1" indicates that PDCCH monitoring is normally performed in the SCell corresponding to the bit "1" in the upcoming DRX-ON duration.

Optionally, the meaning of the bit indicated by the power saving signal or the power saving channel is as follows: "1" indicates that the dormancy behavior is switched to/maintained in the SCell corresponding to the bit "1" in the upcoming DRX-ON duration; "0" indicates that PDCCH monitoring is normally performed in the SCell corresponding to the bit "0" in the upcoming DRX-ON duration.

Optionally, the preceding dormancy behavior can be implemented through switching of the BWP to a dormant BWP. Optionally, the preceding dormancy behavior can be implemented through switching of the BWP from an active state to a dormant state. Optionally, the preceding dormancy behavior can be implemented through switching of the SCell to a dormant SCell state.

Optionally, the meaning of the bit indicated by the power saving signal or the power saving channel is as follows: "0" indicates that the SCell corresponding to the bit "0" skips the upcoming DRX-ON duration, that is, maintains the DRX-OFF state; "1" indicates that PDCCH monitoring is normally performed in the SCell corresponding to the bit "1" in the upcoming DRX-ON duration.

Optionally, the meaning of the bit indicated by the power saving signal or the power saving channel is as follows: "1" indicates that the SCell corresponding to the bit "1" skips the upcoming DRX-ON duration, that is, maintains the DRX- OFF state; "0" indicates that PDCCH monitoring is normally performed in the SCell corresponding to the bit "0" in the upcoming DRX-ON duration.

Optionally, when the UE is configured in a non-CA mode, the UE ignores the carrier operation indication.

Optional Implementation Four

This embodiment mainly describes indicating through a carrier indicator field (CIF) in the DCI what operation a UE should perform. DCI is the abbreviation for downlink control information.

Steps executed at the base station side are described below.

The base station configures DRX for the UE.

The base station configures multiple carriers for the UE.

The base station configures self-carrier scheduling for part or all of the carriers for the UE.

The base station configures the DCI with an indication domain indicating a carrier operation.

The base station sends a power saving signal or a power saving channel to a primary carrier (i.e. PCell) and a secondary carrier (i.e. SCell) within active time. The power saving signal or the power saving channel may be carried on a PDCCH. Optionally, the power saving signal or the power saving channel has the function of indicating BWP switching. Optionally, the power saving signal or the power saving channel has the function of indicating that the SCell is to start and/or end the dormancy behavior. Optionally, the power saving signal or the power saving channel has the function of indicating cross-slot scheduling and the like.

The base station may configure a dormant BWP for the SCell. On such BWP, the UE does not perform PDCCH monitoring but still performs CSI measurement, AGC, beam management and the like.

The base station may configure a BWP dormant state for the SCell. That is, a same BWP may have three states: an active state, an inactive state and a dormant state. A dormancy behavior can be implemented in the BWP dormant state. On the BWP in the dormant state, the UE does not perform PDCCH monitoring but still performs CSI measurement, AGC, beam management and the like.

The base station may configure a Dormant SCell state for the SCell. In the SCell in such state, PDCCH monitoring is not performed, uplink or downlink data transmission are not performed, but CSI (such as CQI/PMI/RI) measurement is still performed.

Steps executed at the terminal side are described below.

Within active time on a SCell, a UE receives a power saving signal or a power saving channel sent by a base station.

The UE performs certain operations according to the carrier operation indication in the DCI. The operations mainly include state switching of the SCell, BWP switching and/or BWP state switching and whether the SCell enters a DRX-OFF state. Optionally, the power saving signal or the power saving channel adopts DCI format 0_0/1_0 in the fallback format. In such format, 1 bit is added as a carrier operation indication.

Optionally, the power saving signal or the power saving channel adopts DCI format 0_1/1_1 in the non-fallback format. In such format, 1 bit is added as a carrier operation indication.

Optionally, the power saving signal or the power saving channel adopts DCI format 0_1/1_1 in the non-fallback format. In the case of self-scheduling, the carrier indicator is enabled, the original meaning of the carrier indicator is changed, and one bit therein is used as a carrier operation indication. Optionally, the highest bit of the 3-bit carrier indicator, 1 bit, is used as the carrier indicator. Optionally, the lowest bit of the 3-bit carrier indicator, 1 bit, is used as the carrier indicator. Optionally, the remaining two bits are used for indicating a carrier Id. Optionally, the remaining two bits are random values. Optionally, the remaining two bits are empty.

Optionally, the power saving signal or the power saving channel adopts DCI format 0_1/1_1 in the non-fallback format. In the case of self-scheduling, the carrier indicator is enabled, the original meaning of the carrier indicator is changed, and all the three bits therein are used as a carrier operation indication. Optionally, the 3 bits are exactly the same, that is, 1 bit is used for indication and repeated 3 times.

Optionally, the power saving signal or the power saving channel adopts DCI format 0_1/1_1 in the non-fallback format. Optionally, when configured as self-scheduling, the 3-bit carrier indicator is used for carrier operation indication of the carrier where the 3-bit carrier indicator is located. Optionally, when configured as cross-carrier scheduling, the carrier indicator is used for indicating the ID of the scheduled carrier.

Optionally, the power saving signal or the power saving channel adopts DCI format 0_1/1_1 in the non-fallback format. Optionally, the DCI is scrambled by using different radio-network temporary identifiers (RNTIs). When RNTI-1 is detected, the carrier indicator carried by the DCI is considered to be used for the carrier operation indication of the carrier where the carrier indicator is located. When RNTI-2 is detected, the carrier indicator carried by the DCI is considered to be used for indicating the ID of the scheduled carrier.

Optionally, the power saving signal or the power saving channel adopts DCI format 0_1/1_1 in the non-fallback format. Optionally, higher-layer signaling is used for indicating that the carrier indicator carried by the DCI is used for a carrier operation indication of the carrier where the carrier indicator is located or for indicating the Id of the scheduled carrier.

Optionally, the meaning of the carrier indicator is as follows: "0" indicates that the dormancy behavior is switched to/maintained in the SCell in the following DRX-ON duration; "1" indicates that PDCCH monitoring is normally performed in the SCell in the following DRX-ON duration.

Optionally, the meaning of the carrier indicator is as follows: "1" indicates that the dormancy behavior is switched to/maintained in the SCell in the following DRX-ON duration; "0" indicates that PDCCH monitoring is normally performed in the SCell in the following DRX-ON duration.

Optionally, the preceding dormancy behavior can be implemented through switching of the BWP to a dormant BWP. Optionally, the preceding dormancy behavior can be implemented through switching of the BWP from an active state to a dormant state. Optionally, the preceding dormancy behavior can be implemented through switching of the SCell to a dormant SCell state.

Optionally, the meaning of the carrier indicator is as follows: "0" indicates that the SCell enters the DRX-OFF state after correctly decoding the power saving signal or the power saving channel; "1" indicates that a PDCCH is monitored in an SCell.

Optionally, the meaning of the carrier indicator is as follows: "1" indicates that the SCell enters the DRX-OFF state after correctly decoding the power saving signal or the power saving channel; "0" indicates that a PDCCH is monitored in an SCell.

Optional Implementation Five

This embodiment mainly describes that the UE performs an operation on an SCell or/and a BWP according to a timer or a specific length of time.

Steps executed at the base station side are described below.

The base station configures DRX for the UE.

The base station configures multiple carriers for the UE.

Optionally, the base station configures one or more of the following resources for a secondary carrier: a default BWP, an initial BWP, a dormant BWP, a power saving BWP, a BWP dormant state, and a Dormant SCell state.

The base station may configure a default BWP for an SCell.

The base station may configure an initial BWP for an SCell.

The base station may configure a dormant BWP for an SCell. On such dormant BWP, the UE does not perform PDCCH monitoring but still performs CSI measurement, AGC, beam management and the like.

The base station may configure a power saving BWP for an SCell. The power saving BWP has one or more power saving characteristics. Optionally, the power saving BWP has a small bandwidth (the smallest bandwidth among those of the BWPs configured on the carrier). Optionally, the power saving BWP has a small number of MIMO layers (the smallest number of MIMO layers among those of the BWPs configured on the carrier). Optionally, the power saving BWP has a large PDCCH monitoring cycle (the largest PDCCH monitoring cycle among those of the BWPs configured on the carrier). Optionally, the power saving BWP is configured with cross-slot scheduling (embodied in the setting of related parameters K0, K1, K2 and A-CSI-RS triggering offset to numbers greater than 0).

That is, a same BWP may have three states: an active state, an inactive state and a dormant state. A dormancy behavior can be implemented in the BWP dormant state. On the BWP in the dormant state, the UE does not perform PDCCH monitoring but still performs CSI measurement, AGC, beam management and the like.

In the SCell in such state, PDCCH monitoring is not performed, uplink or downlink data transmission are not performed, but measurement such as CQI/PMI/RI measurement is still performed.

Steps executed at the terminal side are described below.

Figure 6:
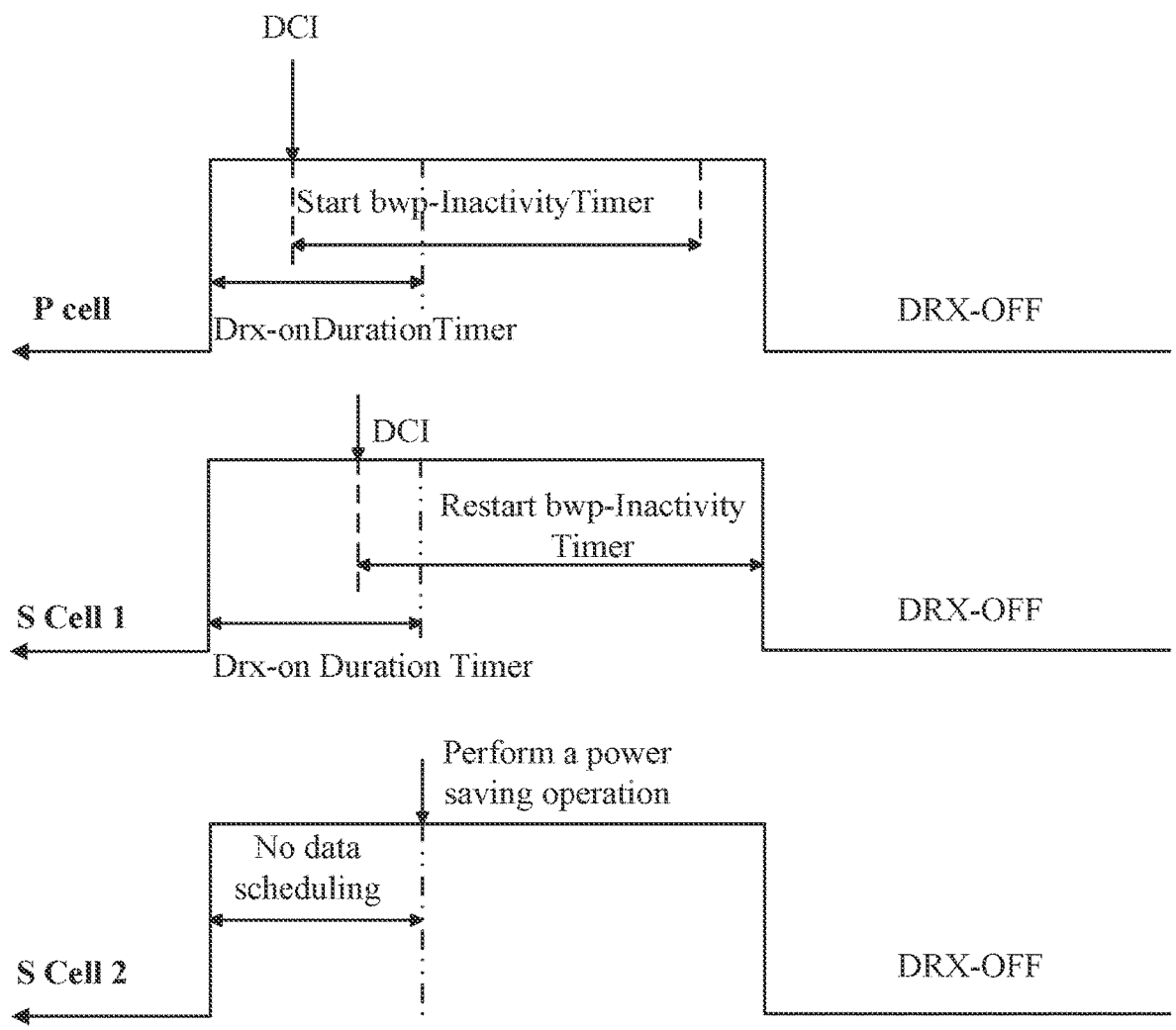
FIG. 6 is a schematic diagram of a power saving operation performed in an SCell according to a data scheduling situation in a multi-carrier scenario according to an optional embodiment of the present disclosure.

The UE performs an operation on an SCell or/and a BWP according to a timer or a specific length of time. In the DRX-ON duration, the UE monitors a PDCCH on the PCell and all activated SCells. If the UE successfully decodes the DCI indicating uplink/downlink scheduling on one or more cells in the DRX-ON duration, the UE starts/restarts a drx-inactivityTimer. In this case, for an SCell where DCI indicating uplink/downlink data scheduling has not been received within a period of time (for example, before the expiration of a DRX-onDurationTimer or absolute duration such as 10 slots) of the DRX-ON duration, the UE may perform a power saving operation on the SCell. FIG. 6 is a schematic diagram of a power saving operation performed in an SCell according to a data scheduling situation in a multi-carrier scenario according to an optional embodiment of the present disclosure, as shown in FIG. 6.

Optionally, the power saving operation is switching from the currently activated BWP to the dormant BWP. Optionally, the power saving operation is switching from the currently activated BWP to the default BWP. Optionally, the power saving operation is switching from the currently activated BWP to the initial BWP. Optionally, the power saving operation is switching from the currently activated BWP to the power saving BWP. Optionally, the power saving operation is switching from the current BWP active state to the BWP dormant state. Optionally, the power saving operation is switching of the SCell from the current active state to the dormant SCell state.

Optionally, if the base station configures a dual connectivity (DC) scenario for the UE, the MCG and SCG of the UE can perform the above operations separately. MCG is the abbreviation for master cell group; SCG is the abbreviation for secondary cell group.

Optional Implementation Six

This embodiment mainly describes BWP binding of carriers on various serving cells: BWP switching on one serving cell causes BWP switching or maintenance of the current BWP. For example, switching or maintenance of a BWP on one serving cell causes synchronous switching or maintenance of a BWP that has a bundle relationship with the BWP.

The base station configures multiple carriers for the UE.

The base station establishes a bundle relationship for designated carriers. Optionally, the designated carriers are a primary carrier and all secondary carriers. Optionally, the designated carriers are a primary carrier and part of the secondary carriers. The bundle relationship is as follows: BWP switching on an SpCell (including a PCell and a PSCell) implicitly indicates that BWP switching is also performed on the secondary carrier having a bundle relationship with the SpCell.

The base station sorts the BWPs configured on each carrier according to the power saving effect, and each BWP corresponds to one power saving level. For example, the first level is the highest power saving level, followed by the second level, and so on. Optionally, the power saving level determination method of a BWP is as follows: according to the bandwidth and the number of MIMO layers, the BWP having the smallest bandwidth and the smallest number of MIMO layers has the highest power saving level.

BWP switching on an SpCell implicitly indicates BWP switching on SCells, and the target BWP to be switched to is selected from a BWP candidate set. The generation method of the BWP candidate set is that the power saving level of a BWP on an SCell is not lower than the power saving level of a BWP on a PCell. It is to be noted that it may be considered that data will be transmitted on a PCell first, and that when a power saving BWP is used in the PCell, a power saving BWP should also be used in the SCell.

The UE performs BWP switching or maintains the current BWP according to the power saving level. Optionally, the selection methods of the candidate BWP set and the target BWP to be switched to are as follows: the number of BWPs in the BWP candidate set does not exceed two, which can avoid always using the most power saving BWP in the SCell. Moreover, two BWPs having the lowest power saving level and meeting the candidate set generation condition are selected to form the BWP candidate set. The BWP having a higher power saving level is preferentially selected as the target BWP. The additional condition is that when the BWP having the lowest power saving level is used in the SpCell, the BWP having the highest power saving level cannot be used in the SCell.

Examples are described below.

Currently, the UE has three activated carriers, that is, a PCell, SCell1 and SCell2. Three BWPs in total exist in the PCell and are BWP0, BWP1 and BWP2 from high to low according to the power saving level, respectively. Four BWPs exist in SCell1 and are BWP0, BWP1, BWP2 and BWP3 from high to low according to the power saving level, respectively. Two BWPs exist in SCell2 and are BWP0 and BWP1 from high to low according to the power saving level, respectively.

When switching to BWP0 having the highest power saving level in the PCell, the BWP candidate sets in SCell1 and SCell2 each include merely one element, {BWP0}. Therefore, in both SCell1 and SCell2, switching is performed to BWP0 having the highest power saving level. If the BWP activated in the SCell is BWP0, a bwp-InactivityTimer is reactivated. When the activated BWP in the PCell is switched from BWP0 to BWP2, the BWP candidate set in SCell1 is {BWP1, BWP2}, and the BWP candidate set in SCell2 is {BWP0, BWP1}. Switching to BWP1 is performed in SCell1 and switching to BWP1 is performed in SCell2 in accordance with the principle that "the BWP having the highest power saving level is preferred and when the BWP having the lowest power saving level is used in the PCell, the BWP having the highest power saving level cannot be used in the SCell". When the activated BWP in the PCell is switched from BWP2 to BWP1, the corresponding BWP candidate sets in SCell1 and SCell2 are both {BWP0, BWP1}, and the BWP having the higher power saving level is preferentially selected in an SCell, so BWP0 is activated in both SCell1 and SCell2.

The UE may perform BWP switching or maintain the current BWP according to the DCI of the SpCell. Optionally, the selection methods of the candidate BWP set and the target BWP are as follows: elements in the BWP candidate set are all BWPs that meet the candidate set generation condition. The BWP having a same power saving level is preferentially selected as the target BWP. When the BWP activated in the SCell is in the candidate set, BWP switching is not performed. The number of times of BWP switching can be reduced so as to avoid delay and unnecessary power consumption caused by frequent switching. When no BWP having the same power saving level exists in the SCell, priority is given to switching to the BWP having an adjacent power saving level.

Examples are described below.

Currently, the UE has three activated carriers, that is, a PCell, SCell1 and SCell2. Three BWPs in total exist in the PCell and are BWP0, BWP1 and BWP2 from high to low according to the power saving level, respectively. Four BWPs exist in SCell1 and are BWP0, BWP1, BWP2 and BWP3 from high to low according to the power saving level, respectively. Two BWPs exist in SCell2 and are BWP0 and BWP1 from high to low according to the power saving level, respectively.

When switching to BWP0 having the highest power saving level in the PCell, the BWP candidate sets in SCell1 and SCell2 each include merely one element, {BWP0}. Therefore, in both SCell1 and SCell2, switching is performed to BWP0 having the highest power saving level. When switching to BWP1 is performed in the PCell, the BWP candidate set in corresponding SCell1 is {BWP0, BWP1}. According to a priority switching principle, switching to BWP1 is performed in both SCell1 and SCell2. When switching to BWP2 is performed in the PCell, the corresponding BWP candidate set in SCell1 is {BWP0, BWP1, BWP2}, and the BWP candidate set in SCell2 is {BWP0, BWP1}. According to the priority switching principle, BWP1 is maintained in both SCell1 and SCell2 without being switched, and the bwp-InactivityTimer is activated.

If the PDCCH of the SpCell indicates DCI for BWP switching so that BWP switching is performed in the SCell, and PDCCH monitoring is performed on the switched BWP, a time difference (offset) exists between the time when the PDCCH starts to be monitored in the SCell and the time when the DCI indicating switching is received in the PCell. The UE completes two actions within this time difference: one is to complete the PDCCH decoding of the PCell; and the other is to complete the BWP switching in the SCell. Optionally, the UE does not perform PDCCH monitoring during the offset. Optionally, the UE does not perform PDCCH buffer during the offset.

Optional Implementation Seven

This embodiment mainly describes that the UE performs BWP switching or maintains the current BWP according to the data transmission rate level of a BWP in a serving cell.

The base station configures multiple carriers for the UE.

The base station establishes a bundle relationship for designated carriers. Optionally, the designated carriers are a primary carrier and all secondary carriers. Optionally, the designated carriers are a primary carrier and part of the secondary carriers. The bundle relationship is as follows: BWP switching on an SpCell implicitly indicates that BWP switching is also performed on the secondary carrier having a bundle relationship with the SpCell.

The base station sorts the BWPs configured on each carrier according to the data transmission rate, and each BWP corresponds to one data transmission rate level. For example, the first level is the highest data transmission rate, followed by the second level, and so on.

BWP switching on the SpCell implicitly indicates BWP switching in an SCell, and the BWP to be switched to is selected from a BWP candidate set. The selection method of the BWP candidate set is as follows: the data transmission rate level of a BWP in the SCell is not higher than the data transmission rate level of a BWP in the SpCell.

The UE performs BWP selection according to the data transmission rate level of a BWP in the serving cell. Optionally, the selection methods of the candidate BWP set and the target BWP to be switched to are as follows: the number of BWPs in the BWP candidate set are limited to not exceed two, which can avoid always using the most power saving BWP in the SCell.

Two BWPs having the highest data transmission rates and meeting the condition are selected to form the BWP candidate set. During switching, the BWP having a low data transmission rate level is preferentially selected as the target BWP. Moreover, when the BWP having the highest data transmission rate level is used in the PCell, the BWP having the lowest data transmission rate level cannot be used in the SCell.

Optionally, the selection methods of the candidate BWP set and the target BWP to be switched to are as follows: elements in the BWP candidate set are all BWPs that meet the candidate set generation condition. The BWP having a same data transmission rate level is preferentially selected as the target BWP. When the activated BWP in the SCell is in the candidate set, BWP switching may not be performed (that is, the current BWP is maintained). The number of times of BWP switching is reduced so as to avoid delay and unnecessary power consumption caused by frequent switching.

When no BWP having the same data transmission rate level exists in the SCell, priority is given to switching to the BWP having an adjacent data transmission rate level.

Optional Implementation Eight

This embodiment mainly describes that the UE performs BWP switching or maintains the current BWP according to a BWP power saving effect or/and BWP power consumption or/and the data transmission rate level of a BWP in the serving cell.

The base station configures multiple carriers for the UE.

The base station configures a BWP having low power consumption for each carrier. Optionally, the BWP having low power consumption is a default BWP. Optionally, the BWP having low power consumption is a power saving BWP. The power saving BWP has one or more power saving characteristics. Optionally, the power saving BWP has a small bandwidth (the smallest bandwidth among those of the BWPs configured on the carrier). Optionally, the power saving BWP has a small number of MIMO layers (the smallest number of MIMO layers among those of the BWPs configured on the carrier). Optionally, the power saving BWP has a large PDCCH monitoring cycle (the largest PDCCH monitoring cycle among those of the BWPs configured on the carrier). Optionally, the power saving BWP is configured with cross-slot scheduling (embodied in the setting of related parameters K0, K1, K2 and A-CSI-RS triggering offset to numbers greater than 0). Optionally, the BWP having low power consumption is a dormant BWP. On such BWP, the UE does not perform PDCCH monitoring but still performs CSI measurement, AGC, beam management and the like.

The base station establishes a bundle relationship for the BWPs having the maximum transmission rates on designated carriers. Optionally, the designated carriers are a primary carrier and all secondary carriers. Optionally, the designated carriers are a primary carrier and part of the secondary carriers. The bundle relationship is as follows: switching to the BWP having the maximum transmission rate in the SpCell implicitly indicates that switching is also performed to the BWP having the maximum transmission rate in the secondary carrier having the bundle relationship with the SpCell. If it is indicated that the BWP having the maximum transmission rate is in use in the SCell, BWP switching is not performed in the SCell, but the bwp-InactivityTimer is reactivated. Optionally, when switching is performed to the BWP having the maximum transmission rate in the SpCell, the BWP having the maximum transmission rate is switched to in the SCell after the current traffic is completed in the process of a random access channel (RACH) if the Scell having the bundle relationship has one of the following situations: data scheduling is being performed, waiting for a retransmission or having sent a scheduling request (SR). Optionally, when switching is performed to the BWP having the maximum transmission rate in the SpCell, the SCell ignores this implicit indication and no BWP switching is performed in the SCell during the RACH process if the Scell having the bundle relationship has one of the following situations: data scheduling is being performed, waiting for a retransmission or having sent an SR.

The base station establishes a bundle relationship for the BWPs having low power consumption on designated carriers. Optionally, the designated carriers are a primary carrier and all secondary carriers. Optionally, the designated carriers are a primary carrier and part of the secondary carriers. Optionally, the BWPs having low power consumption are BWPs of the same property, such as both default BWPs, both power saving BWPs and the like. Optionally, the BWPs having low power consumption are not BWPs of the same property. For example, the BWP having low power consumption is the default BWP on the primary carrier and the power saving BWP on the secondary carrier. For example, the BWP having low power consumption is the power saving BWP on the primary carrier and the dormant BWP on the secondary carrier.

For example, the BWP having low power consumption is the default BWP on the primary carrier, the default BWP on part of the secondary carriers, and the power saving BWP on part of the secondary carriers. The bundle relationship is as follows: switching to the BWP having low power consumption in the Spcell implicitly indicates that switching is also performed to the BWP having low power consumption in the secondary carrier having the bundle relationship with the Spcell; if it is indicated that the BWP having low power consumption is in use in the SCell, BWP switching is not performed in the SCell, but the bwp-InactivityTimer is reactivated. Optionally, when switching is performed to the BWP having low power consumption in the SpCell, the BWP having low power consumption is switched to in the SCell after the current traffic is completed in the RACH process if the Scell having the bundle relationship has one of the following situations: data scheduling is being performed, waiting for a retransmission or having sent an SR. Optionally, when switching is performed to the BWP having low power consumption in the SpCell, the SCell ignores this implicit indication and no BWP switching is performed in the SCell during the RACH process if the Scell having the bundle relationship has one of the following situations: data scheduling is being performed, waiting for a retransmission or having sent an SR.

Figure 7:
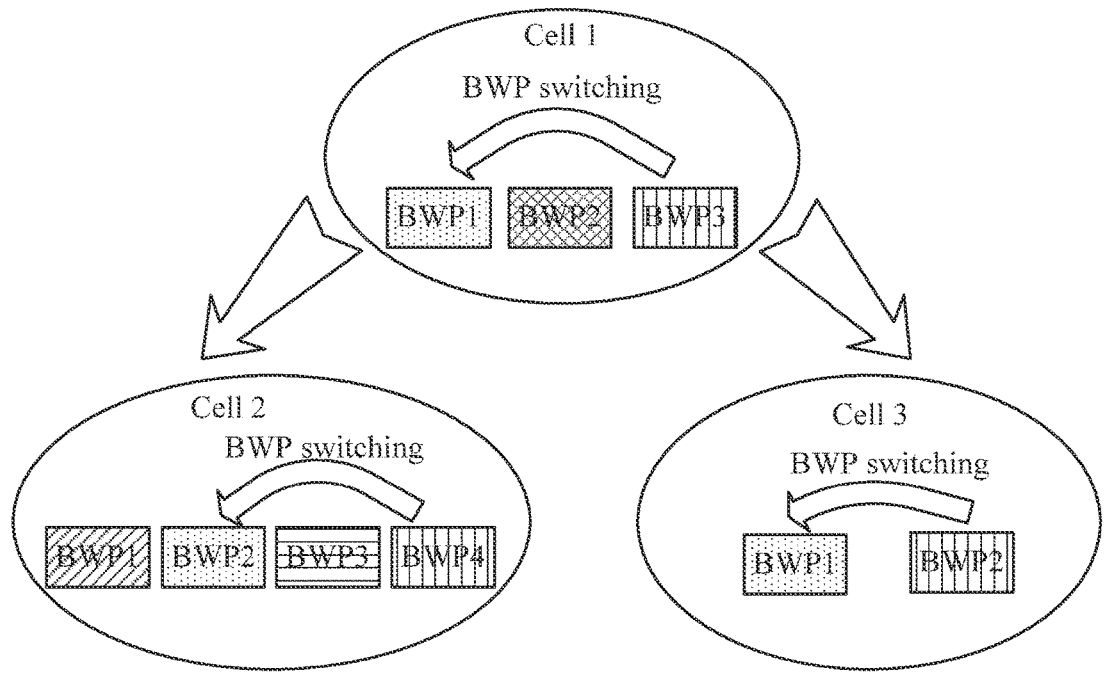
FIG. 7 is a schematic diagram illustrating an operation of BWP switching to a BWP having a maximum transmission rate in a PCell implicitly indicating BWP switching in an SCell having a bundle relationship when BWPs having the maximum transmission rates are bound according to an optional embodiment of the present disclosure.

FIG. 7 is a schematic diagram illustrating an operation of BWP switching to a BWP having a maximum transmission rate in a PCell implicitly indicating BWP switching in an SCell having a bundle relationship when BWPs having the maximum transmission rates are bound according to an optional embodiment of the present disclosure. As shown in FIG. 7, cell 1 is the PCell, and cell 2 and cell 3 denote two SCells. The BWPs having the maximum data transmission rates on the three carriers are BWP1 in cell 1, BWP2 in cell 2 and BWP1 in cell 3. The BWPs having low power consumption are BWP3 in cell1, BWP4 in cell2 and BWP2 in cell3. It is assumed that the current BWPs activated on the three cells are BWP3, BWP4 and BWP2, respectively. Switching from BWP3 to BWP1 in cell 1 implicitly indicates switching from BWP4 to BWP2 in cell 2 and switching from BWP2 to BWP1 in cell 3. Optionally, if the activated BWP in cell 2 is BWP2 at this time, that is, the BWP having low power consumption is in use in cell 2, the bwp-InactivityTimer of cell 2 will be reactivated and BWP switching in cell 2 is not caused when BWP1 is switched to in cell 1.

Figure 8:
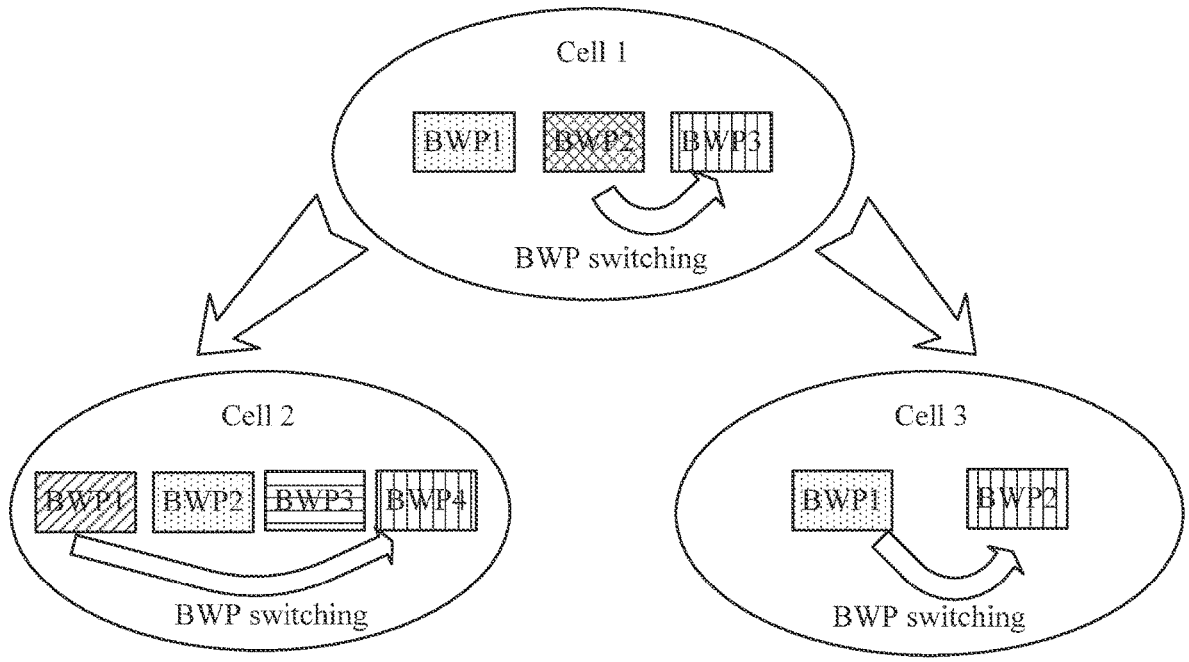
FIG. 8 is a schematic diagram illustrating an operation of BWP switching to a power saving BWP in a PCell implicitly indicating BWP switching in an SCell having a bundle relationship when power saving BWPs are bound according to an optional embodiment of the present disclosure.

FIG. 8 is a schematic diagram illustrating an operation of BWP switching to a power saving BWP in a PCell implicitly indicating BWP switching in an SCell having a bundle relationship when power saving BWPs are bound according to an optional embodiment of the present disclosure. As shown in FIG. 8, if the BWPs currently activated in the three cells are BWP2, BWP1 and BWP1, respectively, switching from BWP2 to BWP3 in cell 1 implicitly indicates switching from BWP1 to BWP4 in cell 2 and switching from BWP1 to BWP2 in cell 3. Optionally, if the activated BWP in cell 2 is BWP4 at this time, that is, the BWP having low power consumption is in use in cell 2, the bwp-InactivityTimer of cell 2 will be reactivated and BWP switching in cell 2 is not caused when BWP3 is switched to in cell 1.

Optionally, the switching of the activated BWP in cell 1 from BWP3 (low power consumption) to BWP2 or from BWP1 (having the maximum data transmission rate) to BWP2 will cause BWP switching nether in cell 2 nor in cell 3.

Optional Implementation Nine

This embodiment mainly describes switching interrupt time of BWPs having a bundle relationship.

The base station configures multiple carriers for the UE.

The base station establishes a bundle relationship for all or part of the BWPs on designated carriers. Optionally, the designated carriers are a primary carrier and all secondary carriers. Optionally, the designated carriers are a primary carrier and part of the secondary carriers. The bundle relationship is as follows: BWP switching on a primary carrier implicitly indicates BWP switching on the secondary carrier having a bundle relationship with the primary carrier.

Figure 9:
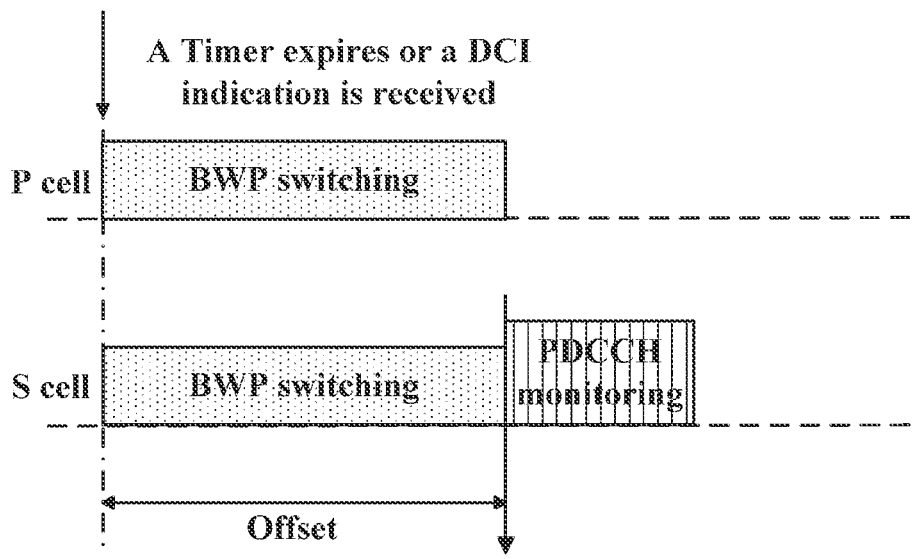
FIG. 9 is a schematic diagram illustrating a process of receiving a BWP switching instruction in a PCell and indicating that an SCell is to perform BWP switching according to an optional embodiment of the present disclosure.

BWP switching may be performed on the primary carrier according to a DCI instruction or a Timer. FIG. 9 is a schematic diagram illustrating a process of receiving a BWP switching instruction in a PCell and indicating that an SCell is to perform BWP switching according to an optional embodiment of the present disclosure. As shown in FIG. 9, optionally, during the offset period, the UE performs PDCCH monitoring neither in the PCell nor in the SCell. Such period is used for BWP switching. Optionally, the offset includes m symbols. Optionally, the UE may start performing PDCCH monitoring after m symbols from the time of receiving the BWP state switching instruction. Optionally, the UE starts performing PDCCH monitoring in the current slot after m symbols from the time of receiving the BWP state switching instruction. Optionally, the UE starts performing PDCCH monitoring in the next slot after m symbols from the time of receiving the BWP state switching instruction.

Optionally, m is related to the sub-carrier space (SCS) currently used by a BWP. Optionally, the value of m is shown in Table 2 below.

TABLE 2

| μ | SCS (KHz) | M (symbols) | Recommended value of m |
|---|---|---|---|
| 0 | 15 | 1-14 | 10 |
| 1 | 30 | 1-14 | 10 |
| 2 | 60 | 1-42 | 30 |
| 3 | 120 | 1-70 | 50 |

Figure 10:
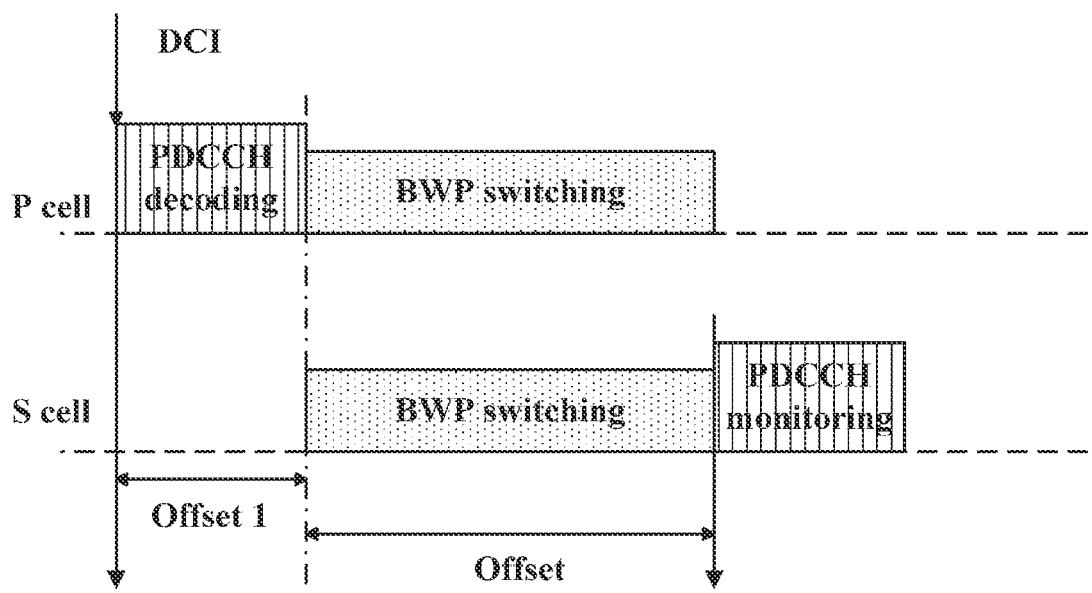
FIG. 10 is a schematic diagram illustrating a process of monitoring a PDCCH in a PCell and indicating that an SCell is to perform BWP switching according to an optional embodiment of the present disclosure.

Optionally, FIG. 10 is a schematic diagram illustrating a process of monitoring a PDCCH in a PCell and indicating that an SCell is to perform BWP switching according to an optional embodiment of the present disclosure. As shown in FIG. 10, BWP switching may be performed on a primary carrier according to a DCI instruction. During the Offset 1 period, PDCCH monitoring may not be performed in the SCell. Optionally, the offset 1 includes p symbols. Optionally, p symbols are 1 to 3 symbols.

Optional Implementation Ten

The base station configures multiple carriers for the UE.

The base station configures a BWP having low power consumption for each secondary carrier. Optionally, the BWP having low power consumption is a default BWP. Optionally, the BWP having low power consumption is a power saving BWP. The power saving BWP has one or more power saving characteristics. Optionally, the power saving BWP has a small bandwidth (the smallest bandwidth among those of the BWPs configured on the carrier). Optionally, the power saving BWP has a small number of MIMO layers (the smallest number of MIMO layers among those of the BWPs configured on the carrier). Optionally, the power saving BWP has a large PDCCH monitoring cycle (the largest PDCCH monitoring cycle among those of the BWPs configured on the carrier). Optionally, the power saving BWP is configured with cross-slot scheduling (embodied in the setting of related parameters K0, K1, K2 and A-CSI-RS triggering offset to numbers greater than 0). Optionally, the BWP having low power consumption is a dormant BWP. On such BWP, the UE does not perform PDCCH monitoring but still performs CSI measurement, AGC, beam management and the like.

The base station establishes a bundle relationship for the BWPs having low power consumption on designated secondary carriers. Optionally, the designated carriers are all secondary carriers. Optionally, the designated carriers are part of the secondary carriers. Optionally, the BWPs having low power consumption are BWPs of the same property and are, for example, both default BWPs or both power saving BWPs. Optionally, the BWPs having low power consumption are not BWPs of the same property. For example, the BWP having low power consumption is the default BWP on part of the carriers and the power saving BWP on the remaining carriers. For example, the BWP having low power consumption is the default BWP on part of the carriers and the dormant BWP on the remaining carriers. For example, the BWP having low power consumption is the default BWP on part of the carriers, the dormant BWP on part of the secondary carriers, and the power saving BWP on part of the carriers. The bundle relationship is as follows: switching to the BWP having low power consumption on any carrier having a bundle relationship implicitly indicates that switching to the BWP having low power consumption is also performed on the remaining carriers having the bundle relationship. If it is indicated that the BWP having low power consumption is in use in the SCell, BWP switching is not performed in the SCell, but the bwp-InactivityTimer is reactivated.

Figure 11:
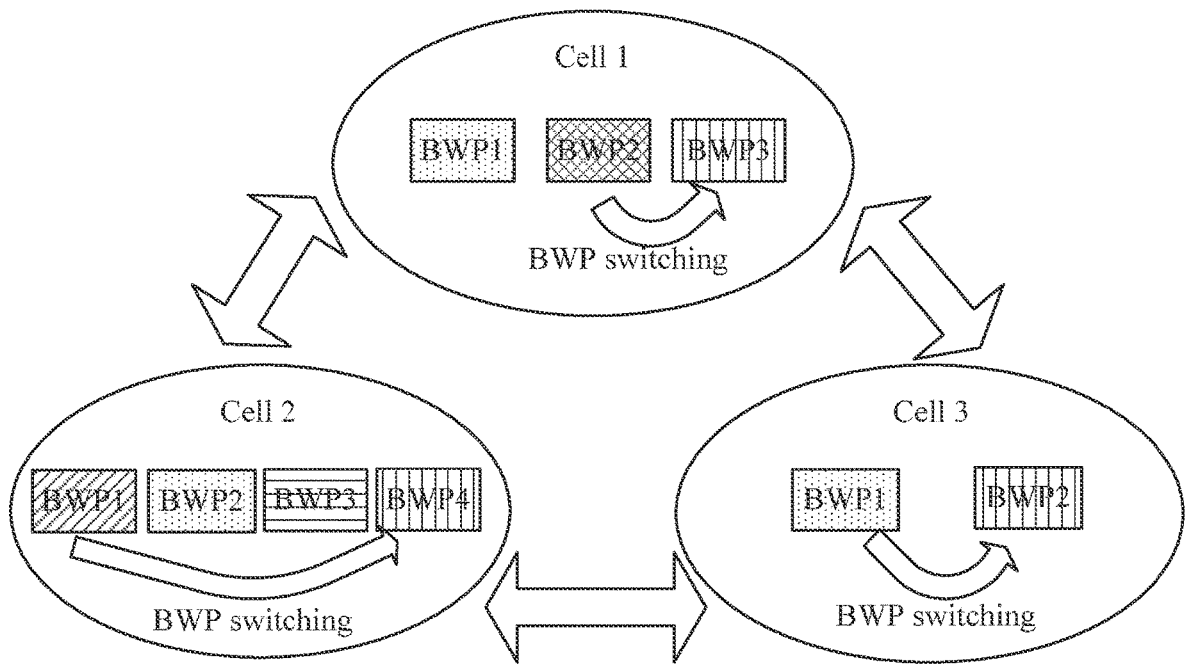
FIG. 11 is a schematic diagram illustrating an operation of switching to a power saving BWP in any bound SCell implicitly indicating BWP switching on a remaining SCell having the bundle relationship when power saving BWPs are bound according to an optional embodiment of the present disclosure.

FIG. 11 is a schematic diagram illustrating an operation of switching to a power saving BWP in any bound SCell implicitly indicating BWP switching on a remaining SCell having the bundle relationship when power saving BWPs are bound according to an optional embodiment of the present disclosure. As shown in FIG. 11, cell 1, cell 2, and cell 3 denote three SCells. The BWPs having low power consumption on three carriers are BWP3, BWP4 and BWP2. It is assumed that the current BWPs activated on the three cells are BWP2, BWP1 and BWP1, respectively. Optionally, switching from BWP2 to BWP3 in cell 1 implicitly indicates switching from BWP1 to BWP4 in cell 2 and switching from BWP1 to BWP2 in cell 3. Optionally, switching from BWP1 to BWP4 in cell 2 implicitly indicates switching from BWP2 to BWP3 in cell 1 and switching from BWP1 to BWP2 in cell 3. Optionally, switching from BWP1 to BWP2 in cell 3 implicitly indicates switching from BWP2 to BWP3 in cell 1 and switching from BWP1 to BWP4 in cell 2. Optionally, if the activated BWP in cell 2 is BWP4 at this time, the bwp-InactivityTimer of cell 2 will be reactivated and BWP switching in cell 2 is not caused when BWP2 is switched to in cell 3.

Optionally, BWP switching to a BWP not having low power consumption on a carrier does not cause BWP switching on other carriers.

Optional Implementation Eleven

This embodiment mainly describes BWP state switching by a UE according to a timer.

Optionally, a base station configures a dormant state for all BWPs. That is, a same BWP may have three states: an active state, an inactive state and a dormant state. A dormancy behavior can be implemented in the BWP dormant state. On the BWP in the dormant state, the UE does not perform PDCCH monitoring but still performs CSI measurement, AGC, beam management and the like.

Figure 12:
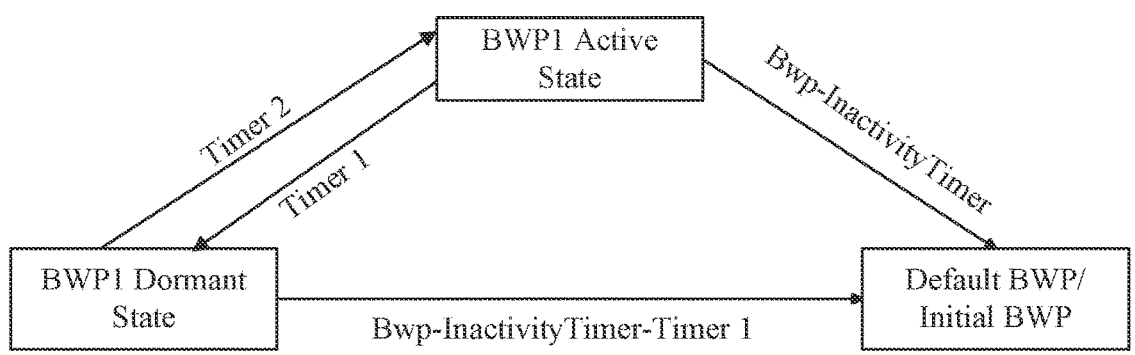
FIG. 12 is a schematic diagram of a BWP state switching method when a dormant state is configured for all BWPs according to an optional embodiment of the present disclosure.

The UE can perform BWP state switching according to the timer. FIG. 12 is a schematic diagram of a BWP state switching method when a dormant state is configured for all BWPs according to an optional embodiment of the present disclosure. As shown in FIG. 12, optionally, the UE activates one BWP and activates Timer 1 while activating a bwp-InactivityTimer. Optionally, Timer 1 may be referred to as a "bwpDormancyTimer". For example, when Timer 1 expires, the currently activated BWP is switched from an active state to a dormant state. Optionally, when uplink and downlink data scheduling exists, the UE restarts Timer 1. Optionally, the length of Timer 1 is less than the length of the bwp-InactivityTimer. Then, the UE first performs switching to the BWP dormant state when timer 1 expires and performs switching to the default/initial BWP when the bwp-inactivityTimer expires.

Optionally, the length of Timer 1 is greater than the length of the bwp-InactivityTimer. The UE performs switching to the default/initial BWP without to the BWP dormant state when the bwp-InactivityTimer expires.

Optionally, when the length of Timer 1 is equal to the length of the bwp-InactivityTimer, the UE performs switching to the default/initial BWP by default.

Optionally, when the length of Timer 1 is equal to the length of the bwp-InactivityTimer, the UE performs switching to the BWP dormant state by default and reactivates the bwp-InactivityTimer.

Optionally, Timer 2 is activated when the BWP is switched to the dormant state. When Timer 2 expires, the BWP is switched back to the active state.

Optionally, Timer 1 and Timer 2 may be configured separately.

Optionally, when Timer 1+Timer 2=bwp-InactivityTimer, the UE performs switching to the default/initial BWP by default.

Optionally, if the currently activated BWP is a default BWP, the default BWP is switched between the BWP active state and the BWP dormant state in the absence of other BWP switching instructions.

Optionally, the base station configures a dormant state for the default/initial BWP. That is, a same BWP may have three states: an active state, an inactive state and a dormant state. A dormancy behavior can be implemented in the BWP dormant state. On the BWP in the dormant state, the UE does not perform PDCCH monitoring but still performs CSI measurement, AGC, beam management and the like.

Figure 13:
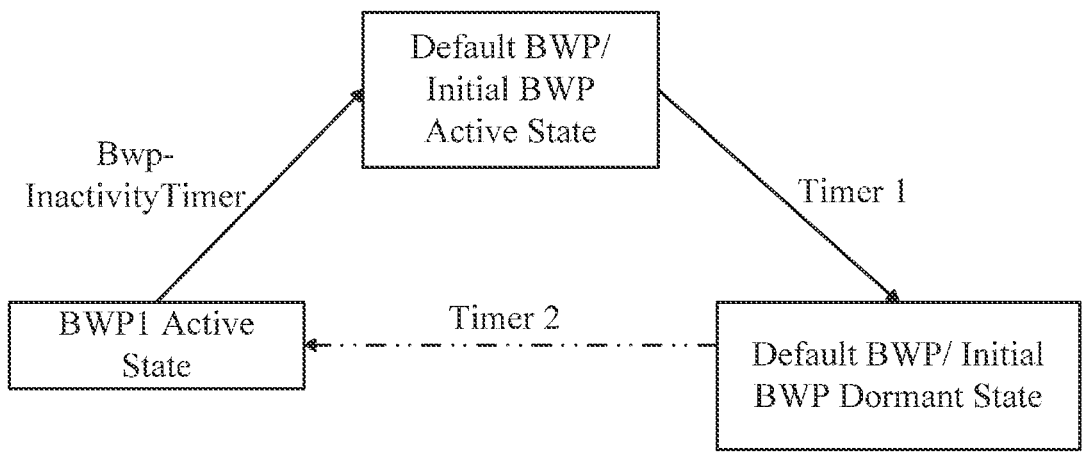
FIG. 13 is a schematic diagram of a BWP switching method when a dormant state is configured merely for a default/initial BWP according to an optional embodiment of the present disclosure.
Figure 14:
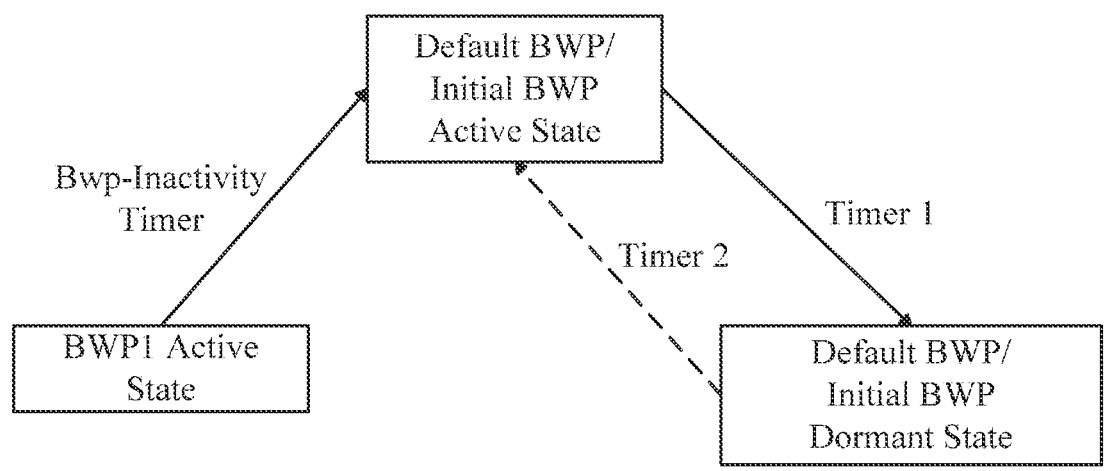
FIG. 14 is a schematic diagram of a BWP state switching method when a dormant state is configured merely for a default/initial BWP according to an optional embodiment of the present disclosure.

Optionally, Timer 1 is activated when the default/initial BWP is activated. Optionally, Timer 1 may be referred to as a "bwpDormancyTimer". For example, when Timer 1 expires, the currently activated BWP is switched from an active state to a dormant state. Optionally, when uplink and downlink data scheduling exists, the UE restarts Timer 1. Optionally, when Timer 1 expires, the UE performs switching to the default/initial BWP dormant state. Optionally, Timer 2 is activated when the default/initial BWP is switched to the dormant state. Optionally, when Timer 2 expires, the UE performs switching to the default/initial BWP active state (as shown in FIG. 14). Optionally, when Timer 2 expires, the UE performs switching to the default/initial BWP (as shown in FIG. 13). When multiple default/initial BWPs are provided, optionally, the BWP having the smallest BWP ID number may be switched to. Optionally, the BWP having the largest BWP ID number may be switched to. Optionally, the BWP having the next BWP ID number (cyclically, for example, 1, 2, 3, 0, 1 . . . ) may be switched to. Optionally, the BWP where data was received/transmitted last time may be switched to. Optionally, the BWP configured with the maximum bandwidth may be switched to. Optionally, the BWP configured with the minimum bandwidth may be switched to. Optionally, the BWP configured with the largest number of MIMO layers may be switched to. Optionally, the BWP having the smallest PDCCH monitoring cycle may be switched to.

Optional Implementation Twelve

This embodiment mainly describes the required duration from the time when the UE receives a BWP state switching instruction to the time when the switching is completed.

A base station configures a dormant state for all or part of the BWPs. That is, a same BWP may have three states: an active state, an inactive state and a dormant state. A dormancy behavior can be implemented in the BWP dormant state. On the BWP in the dormant state, the UE does not perform PDCCH monitoring but still performs CSI measurement, AGC, beam management and the like.

It takes a certain amount of time, for example, n symbols, for the UE to perform switching from the BWP dormant state to the BWP active state. The UE may perform switching from the BWP dormant state to the BWP active state according to a DCI indication or Timer. Optionally, the UE may start performing PDCCH monitoring after n symbols from the time of receiving the BWP state switching instruction. Optionally, the UE starts performing PDCCH monitoring in the current slot after n symbols from the time of receiving the BWP state switching instruction. Optionally, the UE starts performing PDCCH monitoring in the next slot after n symbols from the time of receiving the BWP state switching instruction. For example, when the UE receives a DCI instruction at symbol x (or when the UE is at symbol x, the Timer indicating the UE to perform switching from the BWP dormant state to the BWP active state expires) to indicate that the BWP is to be switched from the dormant state to the active state, PDCCH monitoring may start being performed at symbol (x+n) on the BWP. Optionally, the UE starts performing PDCCH monitoring on the BWP in the current slot of symbol (x+n). Optionally, the UE starts performing PDCCH monitoring on the BWP in the next slot of symbol (x+n). Within the n symbols where no PDCCH monitoring is performed, the UE is required to be ready to perform PDCCH monitoring, for example, turn on the necessary hardware.

Optionally, n is related to the sub-carrier space (SCS) currently used by a BWP. Optionally, the value of n is shown in Table 3 below.

TABLE 3

| μ | SCS (KHz) | N (symbols) | Recommended value of n |
|---|---|---|---|
| 0 | 15 | 1-14 | 5 |
| 1 | 30 | 1-14 | 10 |
| 2 | 60 | 1-42 | 30 |
| 3 | 120 | 1-70 | 50 |

Optional Implementation Thirteen

This embodiment mainly describes that a UE checks a power saving signal or a power saving channel on a shared search space and monitors a search space (for example, a shared search space and a self-scheduled search space) according to the power saving signal or the power saving channel.

The base station configures multiple carriers for the UE.

The base station configures self-carrier scheduling (that is, self-scheduling) for two or more carriers.

The base station may configure search space sharing for the UE through searchSpaceSharingCA-DL or/and searchSpaceSharingCA-UL.

The base station sends the power saving signal or the power saving channel to the UE. The power saving signal or the power saving channel may be sent on the shared search space. The power saving signal or the power saving channel adopts DCI format 0_1/1_1 in a non-fallback format (or the length of the power saving signal or the power saving channel is equal to the length of DCI format 0_1/1_1 in the non-fallback format).

Optionally, the power saving signal or the power saving channel may be sent in the outside active time.

The UE receives the power saving signal or the power saving channel in the shared search space. When the UE successfully decodes the power saving signal or the power saving channel, it is implicitly indicated that CSI measurement and reporting are to be performed in the SCell.

Optionally, the power saving signal or the power saving channel may be sent within active time.

The UE receives the power saving signal or the power saving channel in the shared search space. Before the UE successfully decodes the power saving signal or the power saving channel, the UE does not perform a PDCCH monitoring operation on the SCell (for example, PDCCH monitoring is merely performed on the shared search space). When the UE successfully decodes the power saving signal or the power saving channel, it is implicitly indicated that PDCCH monitoring starts to be performed in the SCell. Optionally, when the UE successfully decodes the power saving signal or the power saving channel, it is implicitly indicated that PDCCH monitoring starts to be performed on the self-scheduled search space in the SCell (for example, PDCCH monitoring is performed on the self-scheduled search space and the shared search space).

Optional Implementation Fourteen

This embodiment mainly describes that a UE monitors a search space (for example, a shared search space and a self-scheduled search space) according to indication in the bit field of a power saving signal or a power saving channel.

The base station configures multiple carriers for the UE.

The base station configures self-carrier scheduling for two or more carriers.

The base station configures search space sharing for the UE through searchSpaceSharingCA-DL.

The base station sends the power saving signal or the power saving channel to the UE. The power saving signal or the power saving channel includes 1 bit indicating the enablement/de-enablement of search space sharing. Optionally, the power saving signal or the power saving channel includes 1 bit indicating the enablement/de-enablement of the self-scheduled search space.

The enablement of the search space sharing refers to that the base station sends scheduling information (the carrier indicator is used for distinguishing the carrier where the scheduling information exists) of a PCell or an SCell on the shared search space. The enablement of the self-scheduled search space refers to that the UE is required to monitor the self-scheduled search space.

The de-enablement of the search space sharing refers to that the base station sends scheduling information in a self-scheduling manner on respective carriers. The de-enablement of the self-scheduled search space refers to that the UE is not required to monitor the self-scheduled search space.

Optionally, the meaning of the 1-bit search space sharing indication is as follows: "0" indicates that search space sharing is enabled; "1" indicates that search space sharing is de-enabled. Optionally, the meaning of the 1-bit search space sharing indication is as follows: "0" indicates that search space sharing is de-enabled; "1" indicates that search space sharing is enabled.

The UE monitors the search space according to indication in the bit field of the power saving signal or the power saving channel. For example, the UE detects the power saving signal or the power saving channel sent by the base station. When the UE successfully decodes the power saving signal or the power saving channel and if the power saving signal or the power saving channel indicates that search space sharing is enabled, the UE does not perform PDCCH monitoring in the SCell but merely performs detection in the shared search space. If the power saving signal or the power saving channel indicates that search space sharing is de-enabled, the UE performs PDCCH monitoring in the SCell by using a self-scheduling scheme. Optionally, before the UE successfully decodes the power saving signal or the power saving channel, the search space sharing is de-enabled by default (in a self-scheduling manner) and PDCCH monitoring is performed on respective carriers. Optionally, when the UE successfully decodes the power saving signal or the power saving channel and if the power saving signal or the power saving channel indicates that the self-scheduled search space is de-enabled, the UE merely monitors the shared search space but not the self-scheduled search space.

Optional Implementation Fifteen

This embodiment mainly describes that a UE monitors a search space (for example, a shared search space and a self-scheduled search space) according to RRC signaling.

The base station configures multiple carriers for the UE.

The base station configures self-carrier scheduling for two or more carriers.

The base station configures search space sharing for the UE through searchSpaceSharingCA-DL.

The base station configures RRC signaling to indicate the enablement/de-enablement of search space sharing.

The enablement of the search space sharing refers to that the base station sends scheduling information (the carrier indicator is used for distinguishing the carrier where the scheduling information exists) of a PCell or an SCell on the shared search space.

The de-enablement of the search space sharing refers to that the base station sends scheduling information in a self-scheduling manner on respective carriers.

When RRC signaling indicates that search space sharing is enabled, the UE merely performs PDCCH monitoring on the shared search space (equivalent to adopting a cross-carrier scheduling method). When the UE successfully receives RRC signaling indicating de-enablement of search space sharing, the UE starts performing PDCCH monitoring in the SCell (equivalent to adopting a self-scheduling method). Optionally, before the UE successfully decodes the power saving signal or the power saving channel, a self-scheduling manner is adopted by default and PDCCH monitoring is performed on respective carriers. Optionally, before the UE receives the RRC signaling indicating search space sharing for the first time, the UE considers by default that search space sharing is de-enabled (in a self-scheduling manner) and PDCCH monitoring is performed on respective carriers.

Optional Implementation Sixteen

This embodiment mainly describes that a UE monitors a search space (for example, a shared search space and a self-scheduled search space) according to a MAC CE.

The base station configures multiple carriers for the UE.

The base station configures self-carrier scheduling for two or more carriers.

The base station configures search space sharing for the UE through searchSpaceSharingCA-DL.

The base station configures MAC CE signaling to indicate the enablement/de-enablement of search space sharing.

The enablement of the search space sharing refers to that the base station sends scheduling information (the carrier indicator is used for distinguishing the carrier where the scheduling information exists) of a PCell or an SCell on the shared search space.

The de-enablement of the search space sharing refers to that the base station sends scheduling information in a self-scheduling manner on respective carriers.

When MAC CE signaling indicates that search space sharing is enabled, the UE merely performs PDCCH monitoring on the shared search space (equivalent to adopting a cross-carrier scheduling method). When the UE successfully receives MAC CE signaling indicating de-enablement of search space sharing, the UE starts performing PDCCH monitoring in the SCell (equivalent to adopting a self-scheduling method). Optionally, before the UE receives the MAC CE signaling indicating search space sharing for the first time, the UE considers by default that search space sharing is de-enabled (in a self-scheduling manner) and PDCCH monitoring is performed on respective carriers.

Optional Implementation Mode Seventeen

This embodiment mainly describes that a UE monitors a search space (for example, a shared search space and a self-scheduled search space) according to a timer.

The base station configures DRX for the UE.

The base station configures multiple carriers for the UE.

The base station configures self-carrier scheduling for two or more carriers.

The base station configures search space sharing for the UE through searchSpaceSharingCA-DL.

The base station configures the Timer to indicate the enablement/de-enablement of search space sharing.

The enablement of the search space sharing refers to that the base station sends scheduling information (the carrier indicator is used for distinguishing the carrier where the scheduling information exists) of a PCell or an SCell on the shared search space.

The de-enablement of the search space sharing refers to that the base station sends scheduling information in a self-scheduling manner on respective carriers.

Optionally, the Timer is configured for per UE.

The Timer (for example, referred to as the searchSpace-Sharing-InactivityTimer) is activated when DRX-ON duration is started. During the operation of the Timer, the UE performs PDCCH monitoring (de-enablement of search space sharing) on respective carriers in a manner of self-carrier scheduling. When the Timer expires, the UE merely performs PDCCH monitoring on the shared search space (equivalent to adopting a cross-carrier scheduling method, where search space sharing is enabled).

Optionally, the Timer is configured for per cell.

The Timer (for example, referred to as the searchSpace-Sharing-InactivityTimer) is activated when DRX-ON duration is started. During the operation of the Timer, the UE performs PDCCH monitoring (de-enablement of search space sharing) on respective carriers in a manner of self-carrier scheduling. During the operation of the Timer, if uplink and downlink data scheduling exists on the carrier where the Timer is located, the Timer on the carrier is reactivated. When the Timer expires, the UE merely performs PDCCH monitoring on the shared search space (equivalent to adopting a cross-carrier scheduling method, where search space sharing is enabled).

Embodiment Three

The embodiments of the present disclosure further provide a storage medium. The storage medium stores a computer program. When the computer program is executed, the steps in any one of preceding method embodiments are performed.

Optionally, in the embodiment, the preceding storage medium may be configured to store a computer program for performing the step described below.

In S1, in a case where a first preset condition is satisfied, a first carrier currently activated is switched to a power saving state, where the first preset condition is satisfied for indicating a power saving operation to be performed.

According to the embodiment of the present disclosure, in the case where the first preset condition is satisfied, the first carrier currently activated is switched to the power saving state, where the first preset condition is satisfied for indicating the power saving operation to be performed. Therefore, the problem of high power consumption of the terminal in the related art can be solved, and the effects of reducing delay and power consumption of the terminal can be achieved.

Optionally, the storage medium is further configured to store the computer program for performing the step described below.

State switching is performed on a first bandwidth part currently activated in the first carrier, and the first bandwidth part is switched to the power saving state.

Alternatively, a first bandwidth part currently activated in the first carrier is switched to a second bandwidth part in the first carrier, where the second bandwidth part has a higher power saving level than the first bandwidth part.

Optionally, the storage medium is further configured to store the computer program for performing the following step: in a case where the first carrier is switched to the power saving state, a second carrier is also switched to the power saving state, where a bundle relationship is configured between the first carrier and the second carrier.

For examples in the embodiment, reference may be made to the examples described in the preceding embodiments and optional implementations. Details are not be repeated in the embodiment.

Optionally, in the embodiment, the storage medium may include, but is not limited to, a universal serial bus flash disk (USB), a read-only memory (ROM), a random access memory (RAM), a mobile hard disk, a magnetic disk, an optical disk or another medium capable of storing a computer program.

The embodiments of the present disclosure further provide a storage medium. The storage medium stores a computer program. When the computer program is executed, the steps in any one of preceding method embodiments are performed.

Optionally, in the embodiment, the preceding storage medium may be configured to store a computer program for performing the step described below.

In S1, first power saving indication information is sent to a terminal, where the first power saving indication information is configured for indicating that a first carrier currently activated is to be switched to a power saving state by the terminal.

According to the embodiment of the present disclosure, in the case where the first preset condition is satisfied, the first carrier currently activated is switched to the power saving state, where the first preset condition is satisfied for indicating the power saving operation to be performed. Therefore, the problem of high power consumption of the terminal in the related art can be solved, and the effects of reducing delay and power consumption of the terminal can be achieved.

Optionally, for specific examples in the embodiment, reference may be made to the examples described in the preceding embodiments and optional implementations. Details are not repeated in the embodiment.

The embodiments of the present disclosure further provide an electronic apparatus which includes a memory and a processor. The memory, for example, the memory 104 in FIG. 1, stores a computer program, and the processor is configured to execute the computer program to perform the steps in any one of the preceding method embodiments.

Optionally, the electronic apparatus may further include a transmission device and an input/output device. Both the transmission device and the input/output device are connected to the processor.

Optionally, in the embodiment, the processor may be configured to perform the step below through a computer program.

In S1, in a case where a first preset condition is satisfied, a first carrier currently activated is switched to a power saving state, where the first preset condition is satisfied for indicating a power saving operation to be performed.

According to the embodiment of the present disclosure, in the case where the first preset condition is satisfied, the first carrier currently activated is switched to the power saving state, where the first preset condition is satisfied for indicating the power saving operation to be performed. Therefore, the problem of high power consumption of the terminal in the related art can be solved, and the effects of reducing delay and power consumption of the terminal can be achieved.

Optionally, in the embodiment, the processor may further be configured to perform the step below through a computer program.

State switching is performed on a first bandwidth part currently activated in the first carrier, and the first bandwidth part is switched to the power saving state.

Alternatively, a first bandwidth part currently activated in the first carrier is switched to a second bandwidth part in the first carrier, where the second bandwidth part has a higher power saving level than the first bandwidth part.

Optionally, in the embodiment, the processor may further be configured to perform the step below through a computer program.

In a case where the first carrier is switched to the power saving state, a second carrier is also switched to the power saving state, where a bundle relationship is configured between the first carrier and the second carrier.

Optionally, for specific examples in the embodiment, reference may be made to the examples described in the preceding embodiments and optional implementations. Details are not repeated in the embodiment.

The embodiments of the present disclosure further provide an electronic apparatus which includes a memory and a processor. The memory, for example, the memory 104 in FIG. 1, stores a computer program, and the processor is configured to execute the computer program to perform the steps in any one of the preceding method embodiments.

Optionally, the electronic apparatus may further include a transmission device and an input/output device. Both the transmission device and the input/output device are connected to the processor.

Optionally, in the embodiment, the processor may be configured to perform the step below through a computer program.

In S1, first power saving indication information is sent to a terminal, where the first power saving indication information is configured for indicating that a first carrier currently activated is to be switched to a power saving state by the terminal.

According to the embodiment of the present disclosure, in the case where the first preset condition is satisfied, the first carrier currently activated is switched to the power saving state, where the first preset condition is satisfied for indicating the power saving operation to be performed. Therefore, the problem of high power consumption of the terminal in the related art can be solved, and the effects of reducing delay and power consumption of the terminal can be achieved.

Optionally, for specific examples in the embodiment, reference may be made to the examples described in the preceding embodiments and optional implementations. Details are not repeated in the embodiment.

Apparently, it is to be understood by those skilled in the art that the modules or steps of the present disclosure may be implemented by a general-purpose computing apparatus and may be concentrated on a single computing apparatus or distributed in a network formed by multiple computing apparatuses. Optionally, these modules or steps may be implemented by program codes executable by the computing apparatus. Thus, these modules or steps may be stored in a storage apparatus and executed by the computing apparatus. Moreover, in some cases, the illustrated or described steps may be executed in a sequence different from the sequence described herein. Alternatively, each of these modules or steps may be implemented by being made into an integrated circuit module or multiple modules or steps among these modules or steps may be implemented by being made into a single integrated circuit module. In this manner, the present disclosure is not limited to any specific combination of hardware and software.

What is claimed is:

1. A method for saving power of a terminal, comprising:
receiving a first power saving indication information, wherein the first power saving indication information is configured with a bit corresponding to a designated carrier, and the bit is configured to indicate that a corresponding operation is to be performed on the designated carrier, wherein the designated carrier comprises a first carrier and wherein the first power saving indication information indicates that the first carrier is to be switched to a power saving state by switching a first bandwidth part currently activated in the first carrier to a second bandwidth part in the first carrier; and
switching the first bandwidth part currently activated in the first carrier to the second bandwidth part in the first carrier, wherein using the second bandwidth part consumes less power than using the first bandwidth part.

2. The method of claim 1, further comprising: receiving from a base station, before switching the first bandwidth part currently activated in the first carrier to the second bandwidth part in the first carrier, a configuration of the second bandwidth part as a power saving bandwidth part.

3. The method of claim 1, wherein a dormant operation is performed, the dormant operation comprising refraining from performing a control channel monitoring operation on the second bandwidth part and performing at least one of channel state information (CSI) measurement, automatic gain control (AGC), or beam management.

4. The method of claim 1, wherein the designated carrier further comprises a second carrier, and the first power saving indication information is further configured to indicate that the second carrier is to be switched to the power saving state, wherein the first carrier and the second carrier are configured for a same terminal.

5. The method of claim 1, wherein the bit is configured to indicate that at least one of the following operations is to be performed on the designated carrier:
switching a bandwidth part on the designated carrier or refraining from performing a control channel monitoring operation on the designated carrier.

6. The method of claim 1, wherein the first power saving indication information is downlink control information carrying a power saving indication identifier.

7. The method of claim 1, further comprising: switching the first carrier in the power saving state to a non-power saving state.

8. The method of claim 7, wherein switching the first carrier in the power saving state to the non-power saving state comprises: receiving a switching indication indicating switching of the first carrier in the power saving state to the non-power saving state; and switching the first carrier in the power saving state to the non-power saving state.

9. The method of claim 7, wherein switching the first carrier in the power saving state to the non-power saving state comprises:
after a preset time period starting from the time receiving the switching indication, switching the first carrier in the power saving state to the non-power saving state.

10. An apparatus for saving power comprising:
a processor; and
a memory, wherein the memory is configured to store a computer program, and
wherein the processor is configured to execute the computer program to implement a method comprising:
receiving a first power saving indication information, wherein the first power saving indication information is configured with a bit corresponding to a designated carrier, and the bit is configured to indicate that a corresponding operation is to be performed on the designated carrier, further wherein the designated carrier comprises a first carrier and wherein the first power saving indication information indicates that the first carrier is to be switched to a power saving state by switching a first bandwidth part currently activated in the first carrier to a second bandwidth part in the first carrier; and
switching the first bandwidth part currently activated in the first carrier to the second bandwidth part in the first carrier, wherein using the second bandwidth part consumes less power than using the first bandwidth part.

11. The apparatus of claim 10, wherein the processor is further configured to execute the computer program to implement the method comprising:
receiving from a base station, before switching the first bandwidth part currently activated in the first carrier to the second bandwidth part in the first carrier, a configuration of the second bandwidth part as a power saving bandwidth part.

12. The apparatus of claim 10, wherein the processor is further configured to execute the computer program to implement a dormant operation, the dormant operation comprising refraining from performing a control channel monitoring operation on the second bandwidth part, and performing at least one of channel state information (CSI) measurement, automatic gain control (AGC), or beam management.

13. The apparatus of claim 10, wherein the designated carrier further comprises a second carrier, and the first power saving indication information is further configured to indicate switching of the second carrier to the power saving state, wherein the first carrier and the second carrier are configured for a same terminal.

14. The apparatus of claim 10, wherein the bit is configured to indicate that at least one of the following operations is to be performed on the designated carrier:
switching a bandwidth part on the designated carrier or refraining from performing a control channel monitoring operation on the designated carrier.

15. The apparatus of claim 10, wherein the first power saving indication information is downlink control information carrying a power saving indication identifier.

16. The apparatus of claim 10, wherein the processor is further configured to execute the computer program to implement the method comprising:
switching the first carrier in the power saving state to a non-power saving state.

17. The apparatus of claim 16, wherein the switching comprises:
receiving a switching indication indicating switching of the first carrier in the power saving state to the non-power saving state; and
switching the first carrier in the power saving state to the non-power saving state.

18. The apparatus of claim 16, wherein the processor is further configured to execute the computer program to switch the first carrier in the power saving state to the non-power saving state by:
after a preset time period starting from the time receiving the switching indication, switching the first carrier in the power saving state to the non-power saving state.

19. A non-transitory computer readable storage medium having a computer program stored thereupon that, when executed by a processor, causes the processor to implement a method comprising:
receiving a first power saving indication information, wherein the first power saving indication information is configured with a bit corresponding to a designated carrier, and the bit is configured to indicate that a corresponding operation is to be performed on the designated carrier, wherein the designated carrier comprises a first carrier and wherein the first power saving indication information indicates that the first carrier is to be switched to a power saving state by switching a first bandwidth part currently activated in the first carrier to a second bandwidth part in the first carrier; and switching the first bandwidth part currently activated in the first carrier to the second bandwidth part in the first carrier, wherein using the second bandwidth part consumes less power than using the first bandwidth part.

\* \* \* \* \*